(12) United States Patent
Zhang et al.

(10) Patent No.: US 11,636,852 B2
(45) Date of Patent: Apr. 25, 2023

(54) HUMAN-COMPUTER INTERACTION METHOD AND ELECTRONIC DEVICE

(71) Applicant: Huawei Technologies Co., Ltd., Shenzhen (CN)

(72) Inventors: Qing Zhang, Beijing (CN); Jinhui Zhang, Beijing (CN); Yibo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 17/284,122

(22) PCT Filed: Oct. 10, 2018

(86) PCT No.: PCT/CN2018/109704
§ 371 (c)(1),
(2) Date: Apr. 9, 2021

(87) PCT Pub. No.: WO2020/073248
PCT Pub. Date: Apr. 16, 2020

(65) Prior Publication Data
US 2021/0383798 A1    Dec. 9, 2021

(51) Int. Cl.
*G10L 15/18* (2013.01)
*G06F 16/332* (2019.01)
(Continued)

(52) U.S. Cl.
CPC ...... *G10L 15/1822* (2013.01); *G06F 16/3329* (2019.01); *G06F 40/279* (2020.01); *G06F 40/30* (2020.01); *G10L 15/22* (2013.01)

(58) Field of Classification Search
CPC . G10L 15/1822; G10L 15/22; G06F 16/3329; G06F 40/279; G06F 40/30
See application file for complete search history.

(56) References Cited

U.S. PATENT DOCUMENTS

| | | | |
|---|---|---|---|
| 2001/0049707 A1* | 12/2001 | Tran | G06F 40/131 |
| | | | 715/256 |
| 2006/0009973 A1 | 1/2006 | Nguyen et al. | |

(Continued)

FOREIGN PATENT DOCUMENTS

| | | |
|---|---|---|
| CN | 103198155 A | 7/2013 |
| CN | 107133349 A | 9/2017 |

(Continued)

OTHER PUBLICATIONS

European Search Opinion for EP 18936324, dated Sep. 6, 2021 (Year: 2021).*

(Continued)

*Primary Examiner* — Eric Yen
(74) *Attorney, Agent, or Firm* — Conley Rose, P.C.

(57) ABSTRACT

A method specifically includes, in a human-computer dialog interaction process, when a server performs slot extraction on user discourse, if there is a slot corresponding to which information fails to be extracted and the slot is an optional key slot, the server asks the user a question to determine whether the information corresponding to the slot is necessary. If the information is necessary, the server further extracts the information corresponding to the slot. If the information is unnecessary, the server does not extract the information corresponding to the slot.

20 Claims, 18 Drawing Sheets

(51) Int. Cl.
  *G06F 40/279* (2020.01)
  *G06F 40/30* (2020.01)
  *G10L 15/22* (2006.01)

(56) References Cited

U.S. PATENT DOCUMENTS

| | | | |
|---|---|---|---|
| 2016/0322050 | A1 | 11/2016 | Wang et al. |
| 2017/0011117 | A1 | 1/2017 | Jiang et al. |
| 2017/0039181 | A1 | 2/2017 | Yael et al. |
| 2019/0087462 | A1* | 3/2019 | Jetcheva ............ G06F 16/9035 |
| 2019/0096394 | A1* | 3/2019 | Ramachandra Iyer ..................... G10L 15/1815 |
| 2019/0139538 | A1* | 5/2019 | Gelfenbeyn ............ G10L 15/22 |
| 2019/0204907 | A1* | 7/2019 | Xie .......................... G06F 3/017 |

FOREIGN PATENT DOCUMENTS

| | | |
|---|---|---|
| CN | 107170446 A | 9/2017 |
| CN | 108073628 A | 5/2018 |
| JP | 2008506156 A | 2/2008 |
| JP | 2016212405 A | 12/2016 |
| JP | 6370962 B1 | 8/2018 |

OTHER PUBLICATIONS

English Translation of Notice of Reasons for Refusal for JP 2021-519867, dated Jul. 25, 2022 (Year: 2022).*
Bohus, D., "The RavenClaw dialog management framework: Architecture and Systems," Computer Speech and Language, Elsevier, London, GB, vol. 23, No. 3, 2009, 30 pages.
D'Haro, L., et al., "Application of backend database contents and structure to the design of spoken dialog services," Expert Systems With Applications, vol. 39, No. 5, 2012, 16 pages.
Stoyanchev, S., et al., "Rapid Prototyping of Form-driven Dialogue Systems Using an Open-source Framework," Proceedings of the 17th Annual Meeting of the Special Interest Group on Discourse and Dialogue, 2016, 4 pages.
Wang, Z., "Policy Learning for Domain Selection in an Extensible Multi-domain Spoken Dialogue System," Proceedings of the 2014 Conference on Empirical Methods in Natural Language Processing (EMNLP), 2014, XP055737090, 11 pages.

* cited by examiner

TO FIG. 6B

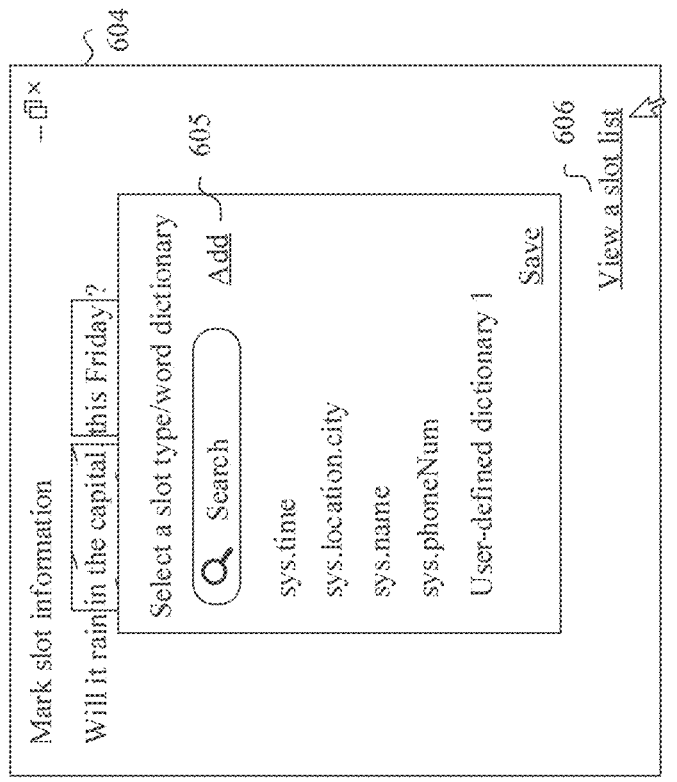
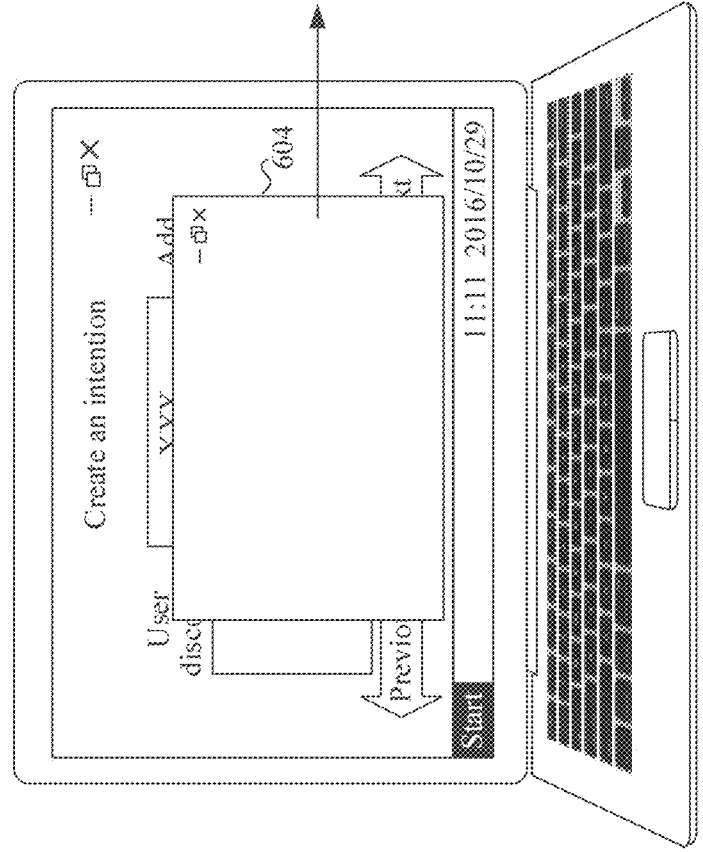
FIG. 6B

CONT. FROM FIG. 6B

| Slot list | | | | | — 🗗 × |
|---|---|---|---|---|---|
| Slot name | Slot type /dictionary | Mandatory slot | Optional key slot | Optional non-key slot | Question |
| Time | sys.time | ○ | ● | ○ | Question 1 🗑 |
| City | sys.location.city | ● | ○ | ○ | Question 2 🗑 |
| User-defined dictionary 1 | User-defined dictionary 1 | ○ | ○ | ● | None 🗑 |
| + Add a slot 607 | | | | | |

```
┌─────────────────────────────────────────────────────────┐
│  Add a slot type/dictionary                    — ☐ ✕    │──── 700
│  ┌─────────────────────────────────────────┐ ┌701       │
│  │ Enter the name of the slot type to be added and press Enter │   Save
│  └─────────────────────────────────────────┘            │
│                                                         │
│       ┌─ 702          ┌─ 703                            │
│    Value           Synonym              Operation       │
│  ─────────────────────────────────────────────────────  │
│    Enter a value,  Enter a synonym                      │
│    press Enter     and press Enter      + Add a row     │
│  ┌ ─ ─ ─ ─ ─ ─ ─ ─ ─ ─ ─ ─ ─ ─ ─ ─ ─ ─ ─ ─ ─ ─ ─ ─ ┐    │
│  │ Shanghai       Shanghai, Hu             🗑        │    │
│  │                                                 │    │
│  │ Beijing        Beijing, jing,           🗑        │────704
│  │                and capital                      │    │
│  └ ─ ─ ─ ─ ─ ─ ─ ─ ─ ─ ─ ─ ─ ─ ─ ─ ─ ─ ─ ─ ─ ─ ─ ─ ┘    │
│                             ┌─ 705                      │
│   + Add slot types in batches                           │
│                                                         │
│  ▓Start▓                         11:11  2016/10/29      │
└─────────────────────────────────────────────────────────┘

FIG. 7
```

HUMAN-COMPUTER INTERACTION METHOD AND ELECTRONIC DEVICE

CROSS-REFERENCE TO RELATED APPLICATIONS

This application is a national stage of International Application No. PCT/CN2018/109704, filed on Oct. 10, 2018, which is hereby incorporated by reference in its entirety.

TECHNICAL FIELD

This application relates to the field of communications technologies, and in particular, to a human-computer interaction method and an electronic device.

BACKGROUND

A human-computer dialog system, or referred to as a human-computer dialog platform, a chatbot (chatbot), or the like, is a new-generation human-computer interaction interface. The chatbot can make a dialog with a user, recognize a user intention during the dialog, and provide services such as meal ordering, ticket booking, and ride hailing for the user.

FIG. 1A is an example of a process of a dialog between a chatbot and a user. The example is used to describe a working process of the chatbot, and the working process may include an open domain dialog, an entry criteria, and a closed domain dialog. The open domain dialog is a dialog made when the chatbot has not recognized a user intention. When the user says "Call a car for me", the chatbot determines the user intention (that is, a ride-hailing service) through logical judgment (that is, the entry criteria), and then jumps to the closed domain dialog. The closed domain dialog is a dialog made to clarify a purpose of the user (or clarify task details) after the user intention is recognized.

The closed domain dialog specifically includes a slot filling process, a wording clarification process, and a result responding process. The slot filling process is a process of filling a slot with information to enable a user intention to be converted into a specific user instruction. A slot may be understood as key information used by the user to express an intention. For example, in the dialog shown in FIG. 1A, slots corresponding to the ride-hailing service include a departure place slot, a destination slot, and a departure time slot. The chatbot extracts information (for example, a slot value) corresponding to the slots based on the dialog with the user. When some necessary information is missing in the information corresponding to the slots, the chatbot actively asks a question, and the user answers the question, so that the chatbot fills, based on an answer of the user, the necessary information corresponding to the slots. This process is referred to as the wording clarification process. After collecting all information corresponding to the slots, the chatbot may perform a corresponding operation, for example, place an order for the user by using a ride-hailing application, and notify the user after placing the order, that is, the result responding process.

Currently, there are two types of slots: a mandatory slot and an optional slot. When the chatbot fails to extract information corresponding to the mandatory slot, the chatbot actively asks a question, to request the user to clarify the information, until the information corresponding to the mandatory slot is extracted. If the chatbot fails to extract information corresponding to the optional slot, the chatbot does not ask a question, but directly performs a corresponding operation based on a case that there is no information corresponding to the optional slot.

In an actual scenario, the chatbot usually fails to extract key information corresponding to some optional slots due to factors such as a user input error, a speech recognition error, or an inaccurate slot extraction algorithm. Consequently, a subsequent operation performed by the chatbot may not meet a user requirement. For example, in the dialog shown in FIG. 1A, "Carpool" said by the user may be key information corresponding to an optional slot. When the chatbot does not accurately extract the key information, the chatbot may not call a carpooling service for the user. This is against a user intention and severely affects user experience.

SUMMARY

This application provides a human-computer interaction method and an electronic device, to accurately recognize a user intention, meet a requirement of a user, and improve user experience.

According to a first aspect, a method is provided in this application and may be applied to a human-computer dialog system. The method includes: A server receives a first input, where the first input includes a service requirement of a user. The server determines, based on the first input, a first field corresponding to the first input, where the first field is a task scenario corresponding to the service requirement of the user. The server distributes the first input to an intention recognition model corresponding to the first field, and recognizes a first intention corresponding to the first input, where the first intention is a sub-scenario of the first field. The server extracts, from the first input, information corresponding to a first slot in the first intention, where the first slot is preconfigured in the first intention, and the first slot is an optional key slot. When the server determines that the information corresponding to the first slot fails to be extracted, the server asks the user a question, to determine whether the information corresponding to the first slot is necessary. The server receives a second input, where the second input includes information that is answered by the user to determine whether the information corresponding to the first slot is necessary. If the user determines that the information corresponding to the first slot is necessary information, the server extracts the information corresponding to the first slot from the second input, and the server performs, based on the first intention and the information corresponding to the first slot, an operation corresponding to the first intention: or if the user determines that the information corresponding to the first slot is unnecessary information, the server does not extract the information corresponding to the first slot, and the server performs, based on the first intention, an operation corresponding to the first intention.

The first input may be one piece of discourse in a single round of dialog between the user and the server 200, or may be a plurality of pieces of discourse in a plurality of rounds of dialogs between the user and the server 200. This is not limited in this embodiment of this application.

The second input may be one piece of discourse in a single round of dialog between the user and the server 200, or may be a plurality of pieces of discourse in a plurality of rounds of dialogs between the user and the server 200. This is not limited in this embodiment of this application.

It may be understood that the optional key slot means that when expressing an intention, the user does not necessarily express information corresponding to the slot. If the information corresponding to the slot is not expressed, a chatbot may ignore the information corresponding to the slot. However, if the user has expressed the information corresponding to the slot, the chatbot needs to accurately extract the information corresponding to the slot.

It can be learned that in this embodiment of this application, in a process in which the server automatically extracts information corresponding to all preset slots based on user discourse, if there is a slot corresponding to which information fails to be extracted, and the slot is an optional key slot, the chatbot actively asks for confirmation from the user about whether the information corresponding to the optional key slot is necessary. If the information is necessary, the chatbot continues to extract the information corresponding to the optional key slot based on an answer of the user. If the information is unnecessary, the chatbot no longer extracts the information corresponding to the optional key slot, in other words, the chatbot does not ask for further confirmation from the user. In this way, when the information corresponding to the optional key slot fails to be extracted, the chatbot may further ask for confirmation from the user, to ensure accurate recognition of a user intention, meet a user requirement, and improve user experience.

In a possible implementation, that a server extracts, from the first input, information corresponding to a first slot in the first intention includes:

The server inputs each word or each entity recognized from the first input into a slot extraction model corresponding to the first slot, and calculates a confidence level corresponding to each word or each entity in the first input. If a confidence level of a first word or a first entity in the first input is greater than or equal to a first threshold, the server determines that the first word or the first entity is the information corresponding to the first slot; or if the confidence level of each word or each entity in the first input is less than the first threshold, the server determines that the information corresponding to the first slot fails to be extracted.

In a possible implementation, the method further includes: If the first slot corresponds to a user-defined slot type, the server calculates a similarity between each entity recognized from the first input and each word of the user-defined slot type.

If the similarity between each entity recognized from the first input and each word of the user-defined slot type is less than a second threshold, the server determines that the first input does not include the information corresponding to the first slot; if a similarity between a second entity in the first input and a second word of the user-defined slot type is greater than or equal to a third threshold, the server determines that the second word is the information corresponding to the first slot; or if a similarity between any entity in the first input and any word of the user-defined slot type is greater than or equal to the second threshold and less than the third threshold, the server determines to ask the user a question, to determine whether the information corresponding to the first slot is necessary.

When a similarity between an entity and a keyword in a user dictionary is to be determined, a Levenshtein distance between an entity recognized from the first input and the keyword in the user dictionary may be calculated by using, for example, an algorithm based on a pinyin similarity or an algorithm based on a character string similarity to determine the similarity between the entity and the keyword in the user dictionary. Alternatively, a similarity between words or phrases may be calculated by using a deep learning word vector, a sentence vector, or the like. A similarity calculation method is not limited in this embodiment of this application.

When a user input error or a speech recognition error occurs, the user has been likely to say the information corresponding to the first slot, but the server fails to extract the information corresponding to the first slot. The server 200 may trigger a user confirmation mechanism only when the server determines, by using an error correction method, that an entity recognized from user discourse (that is, the first input) is relatively similar to the keyword in the user dictionary. This reduces a quantity of times of confirmation by the user, avoids excessive disturbance to the user, and improves user experience.

In a possible implementation, the method further includes: If the confidence level of each word or each entity in the first input is less than a fourth threshold, the server determines that the first input does not include the information corresponding to the first slot; or if a confidence level of any word or any entity in the first input is less than the first threshold and is greater than or equal to the fourth threshold, the server determines to ask the user a question, to determine whether the information corresponding to the first slot is necessary.

When the user correctly expresses the information corresponding to the first slot, the information corresponding to the first slot may fail to be extracted due to an inaccurate slot extraction model. For example, the server generates an inaccurate slot extraction model through training because relatively less user discourse is input, or inaccurate user discourse is input before a skill developer trains the slot extraction model. In this case, the user may set a confirmation threshold. When a slot marking probability value provided by the slot extraction model for the entity recognized from the user discourse is greater than the confirmation threshold, the server triggers the user confirmation mechanism. This reduces a quantity of times of confirmation by the user, avoids excessive disturbance to the user, and improves user experience.

In a possible implementation, if the user determines that the information corresponding to the first slot is necessary information, that the server extracts the information corresponding to the first slot from the second input includes: If the user determines that the information corresponding to the first slot is necessary information, the server extracts the information corresponding to the first slot from the second input by using the slot extraction model corresponding to the first slot or by using a rule.

For a same entity and a same slot extraction model, the slot extraction model may not correctly recognize the entity for the first time, but can correctly recognize the entity for the second time. This is because when the user says the entity for the first time, a statement may include another entity. That is, the entity has a context. If the slot extraction model is inaccurate, the entity may fail to be recognized because the context fails to be recognized. Then, when the server cannot recognize the entity for the first time, the server asks the user a question about the entity. In this case, an answer of the user is about the entity. The answer of the user may include only the entity, or very few contexts, and the slot extraction model is likely to recognize the entity this time. In some other embodiments, the entity may also be recognized from the answer of the user in a manner in which the slot extraction model is not used. For example, a rule may be enabled to recognize the entity. The rule is that the entity may be recognized with reference to factors such as context logic of the answer of the user, an association with a user intention, and a correspondence between the entity and the first slot. This can also effectively increase a probability that the server recognizes the entity said by the user for the second time or a subsequent time.

In a possible implementation, a second slot is further preconfigured in the first intention, and the second slot is a mandatory slot; and the human-computer interaction method further includes: When the server determines that information corresponding to the second slot fails to be extracted, the server asks the user a question, to extract the information corresponding to the second slot. The server receives a third input, and extracts the information corresponding to the second slot from the third input, where the third input includes an answer of the user. The server performs, based on the first intention, the information corresponding to the first slot, and the information corresponding to the second slot, the operation corresponding to the first intention; or the server performs, based on the first intention and the information corresponding to the second slot, the operation corresponding to the first intention.

In a possible implementation, a third slot is further preconfigured in the first intention, the third slot is an optional non-key slot, and the human-computer interaction method further includes: When the server determines that information corresponding to the third slot fails to be extracted, the server does not extract the information corresponding to the third slot.

According to a second aspect, a server is provided. The server may be applied to a human-computer dialog system, and includes a communications interface, a memory, and a processor, where the communications interface and the memory are coupled to the processor, the memory is configured to store computer program code, the computer program code includes a computer instruction, and when the processor reads the computer instruction from the memory, the server is enabled to perform the following steps:

receiving a first input through the communications interface, where the first input includes a service requirement of a user; determining, based on the first input, a first field corresponding to the first input, where the first field is a task scenario corresponding to the service requirement of the user; distributing the first input to an intention recognition model corresponding to the first field, and recognizing a first intention corresponding to the first input, where the first intention is a sub-scenario of the first field; extracting, from the first input, information corresponding to a first slot in the first intention, where the first slot is preconfigured in the first intention, and the first slot is an optional key slot; when the server determines that the information corresponding to the first slot fails to be extracted, asking the user a question, to determine whether the information corresponding to the first slot is necessary; receiving a second input through the communications interface, where the second input includes information that is answered by the user to determine whether the information corresponding to the first slot is necessary; and if the user determines that the information corresponding to the first slot is necessary information, extracting the information corresponding to the first slot from the second input, and performing, based on the first intention and the information corresponding to the first slot, an operation corresponding to the first intention; or if the user determines that the information corresponding to the first slot is unnecessary information, skipping extracting the information corresponding to the first slot, and performing, based on the first intention, an operation corresponding to the first intention.

In a possible implementation, that the processor extracts, from the first input, information corresponding to a first slot in the first intention specifically includes: The processor inputs each word or each entity recognized from the first input into a slot extraction model corresponding to the first slot, and calculates a confidence level corresponding to each word or each entity in the first input; if a confidence level of a first word or a first entity in the first input is greater than or equal to a first threshold, determines that the first word or the first entity is the information corresponding to the first slot; or if the confidence level of each word or each entity in the first input is less than the first threshold, determines that the information corresponding to the first slot fails to be extracted.

In a possible implementation, the processor is further configured to: if the first slot corresponds to a user-defined slot type, calculate a similarity between each entity recognized from the first input and each word of the user-defined slot type; and if the similarity between each entity recognized from the first input and each word of the user-defined slot type is less than a second threshold, determine that the first input does not include the information corresponding to the first slot; if a similarity between a second entity in the first input and a second word of the user-defined slot type is greater than or equal to a third threshold, determine that the second word is the information corresponding to the first slot; or if a similarity between any entity in the first input and any word of the user-defined slot type is greater than or equal to the second threshold and less than the third threshold, determine to ask the user a question, to determine whether the information corresponding to the first slot is necessary.

In a possible implementation, the processor is further configured to: if the confidence level of each word or each entity in the first input is less than a fourth threshold, determine that the first input does not include the information corresponding to the first slot; or if a confidence level of any word or any entity in the first input is less than the first threshold and is greater than or equal to the fourth threshold, determine to ask the user a question, to determine whether the information corresponding to the first slot is necessary.

In a possible implementation, if the user determines that the information corresponding to the first slot is necessary information, that the processor extracts the information corresponding to the first slot from the second input specifically includes: If the user determines that the information corresponding to the first slot is necessary information, the processor extracts the information corresponding to the first slot from the second input by using the slot extraction model corresponding to the first slot or by using a rule.

In a possible implementation, when a second slot is further preconfigured in the first intention, and the second slot is a mandatory slot, the processor is further specifically configured to: when the processor determines that information corresponding to the second slot fails to be extracted, ask the user a question, to extract the information corresponding to the second slot; receive a third input through the communications interface, and extract the information corresponding to the second slot from the third input, where the third input includes an answer of the user; and perform, based on the first intention, the information corresponding to the first slot, and the information corresponding to the second slot, the operation corresponding to the first intention: or perform, based on the first intention and the information corresponding to the second slot, the operation corresponding to the first intention.

In a possible implementation, when a third slot is further preconfigured in the first intention, the third slot is an optional non-key slot, the processor is further specifically configured to: when the processor determines that information corresponding to the third slot fails to be extracted, skip extracting the information corresponding to the third slot.

According to a third aspect, a computer storage medium is provided, and includes a computer instruction. When the computer instruction is run on a terminal, the terminal is enabled to perform the method in any one of the first aspect or the possible implementations of the first aspect.

According to a fourth aspect, a computer program product is provided. When the computer program product is run on a computer, the computer is enabled to perform the method in any one of the first aspect or the possible implementations of the first aspect.

BRIEF DESCRIPTION OF DRAWINGS

FIG. 6A to FIG. 6C are a schematic diagram of some other interfaces of an electronic device according to an embodiment of this application;

FIG. 7 is a schematic diagram of some other interfaces of an electronic device according to an embodiment of this application;

DESCRIPTION OF EMBODIMENTS

Figure 1A:
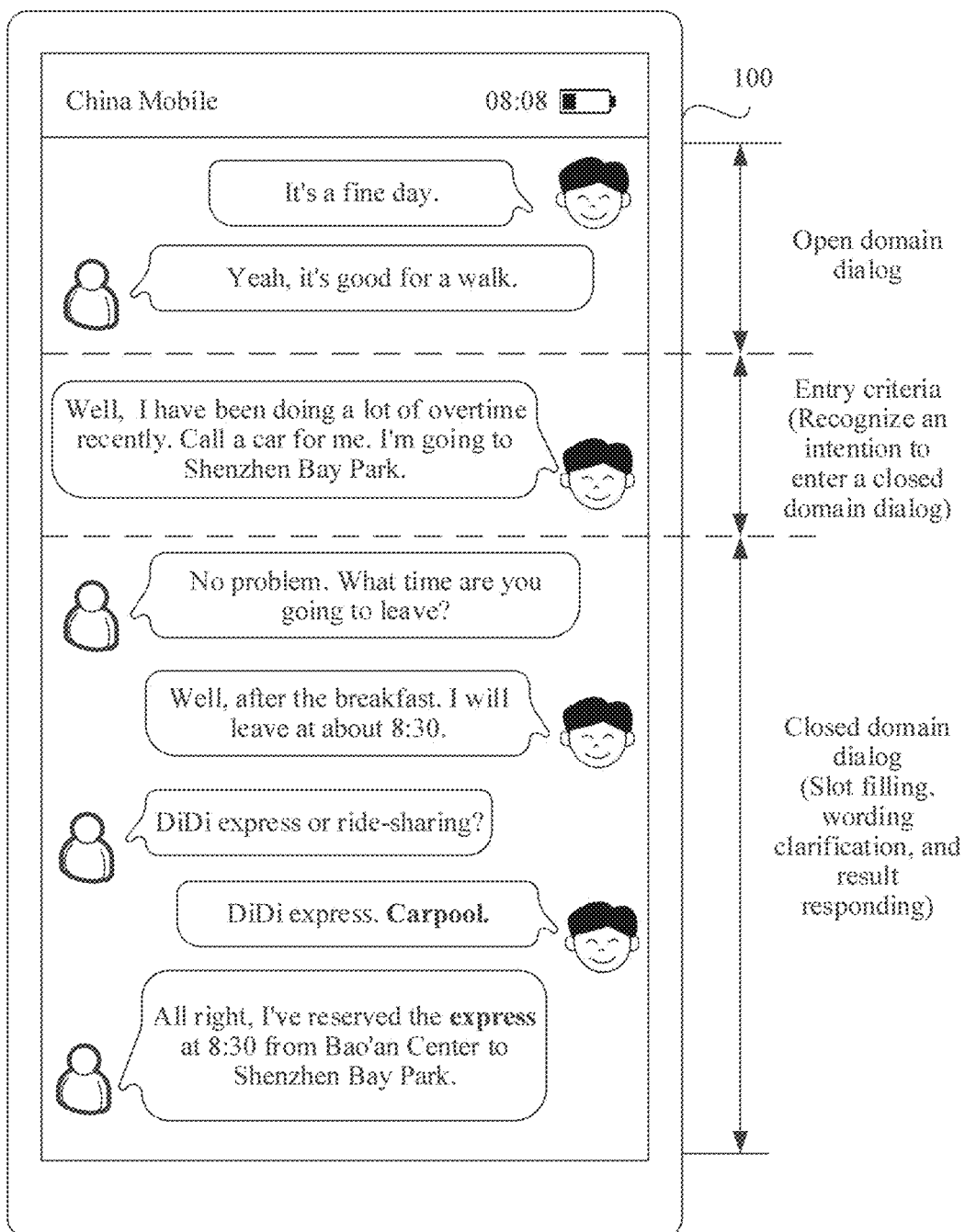
FIG. 1A is a schematic diagram of a terminal interface for a human-computer dialog in the prior art.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality" means two or more than two.

In the prior art, a chatbot fails to extract key information corresponding to some optional slots due to factors such as a user input error, a speech recognition error, or an inaccurate slot extraction algorithm. Consequently, a subsequent operation performed by the chatbot does not meet a user requirement. The embodiments of this application provide a human-computer interaction method, to further classify optional slots into an optional key slot and an optional non-key slot. In addition, a user confirmation mechanism is configured for the optional key slot. To be specific, in a process in which the chatbot automatically extracts information corresponding to all preset slots based on user discourse, if there is a slot corresponding to which information fails to be extracted, and the slot is an optional key slot, the chatbot actively asks for confirmation from a user about whether the information corresponding to the optional key slot is necessary. If the information is necessary, the chatbot continues to extract, based on an answer of the user, the information corresponding to the optional key slot. If the information is unnecessary, the chatbot no longer extracts the information corresponding to the optional key slot in other words, the chatbot does not ask for further confirmation from the user. In this way, when the information corresponding to the optional key slot fails to be extracted, the chatbot may further ask for confirmation from the user, to ensure accurate recognition of a user intention, meet a user requirement, and improve user experience.

It may be understood that the optional key slot means that when expressing an intention, the user does not necessarily express information corresponding to the slot. If the information corresponding to the slot is not expressed, the chatbot may ignore the information corresponding to the slot. However, if the user has expressed the information corresponding to the slot, the chatbot needs to accurately extract the information corresponding to the slot.

Figure 1B:
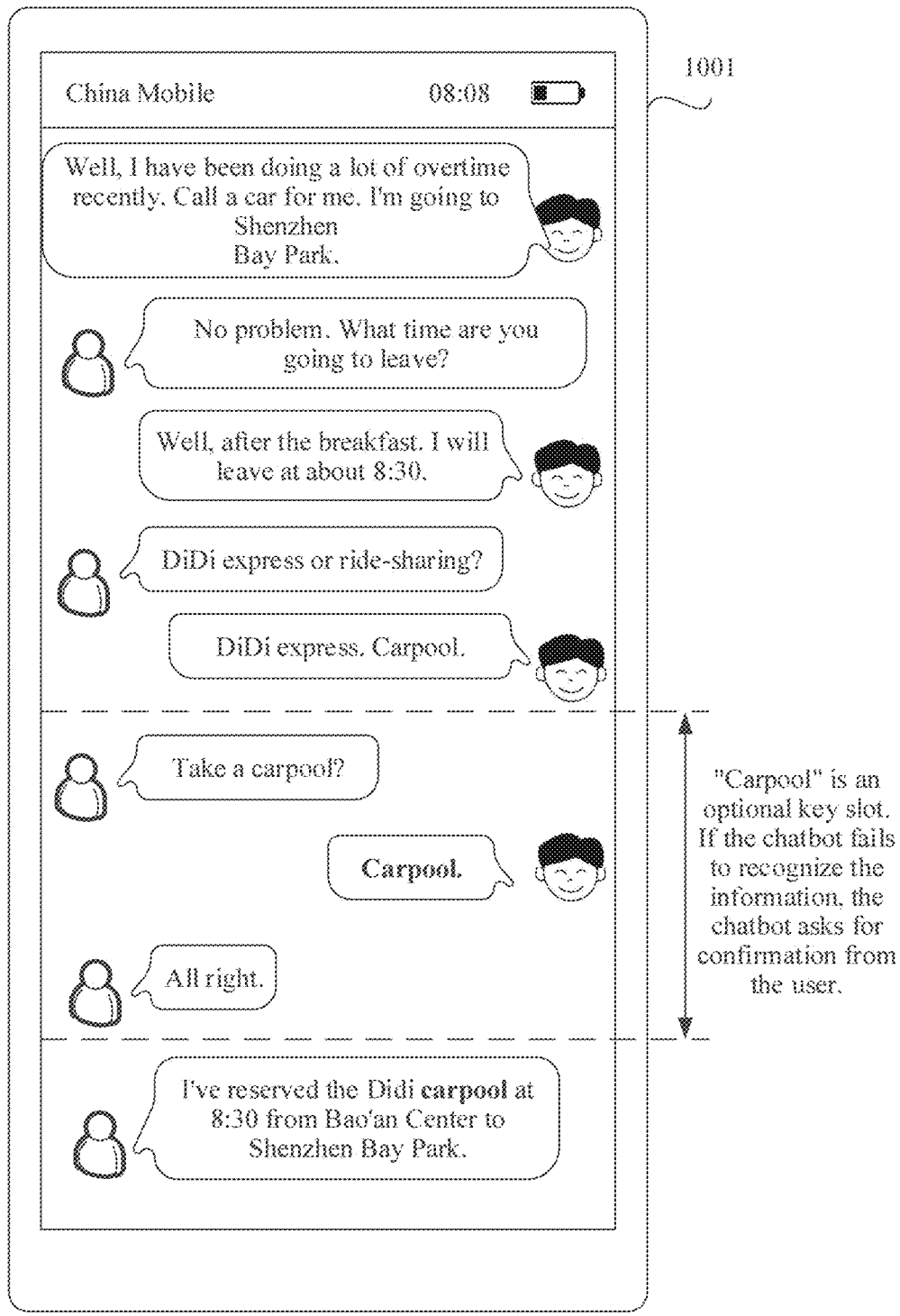
FIG. 1B is a schematic diagram of a terminal interface for a human-computer dialog according to an embodiment of this application.

For example, FIG. 1B shows an example of a process of a dialog between a chatbot and a user according to an embodiment of this application. "Carpool" is configured as an optional key slot in a ride-hailing application. In the dialog between the chatbot and the user, the user says "Carpool", but the chatbot fails to extract the information (that is, information corresponding to the optional key slot). In this case, the chatbot needs to ask for further confirmation from the user, that is, ask the user a question "Take a carpool?". Then, the chatbot extracts the information corresponding to the optional key slot from an answer of the user, to ensure that an operation corresponding to a user intention is accurately performed.

If the answer of the user is "Carpool", it indicates that the user is willing to carpool, and the information corresponding to the optional key slot is important. After extracting the information corresponding to the optional key slot, the chatbot may place a carpooling order for the user. If the answer of the user is "Do not carpool", it indicates that the user is unwilling to carpool, and the information corresponding to the optional key slot is important. After extracting the information corresponding to the optional key slot, the chatbot may place a non-carpooling order for the user. If the answer of the user is "It doesn't matter", it indicates that the information corresponding to the optional key slot is not important. The chatbot may place an order for the user without considering a carpooling factor. It may be understood that, asking for confirmation from the user about the information corresponding to the optional key slot can not only complete extraction of important information corresponding to the optional key slot, but also help determine willingness of the user. This further helps improve accuracy of executing an operation corresponding to a user intention by the chatbot, and improves user experience.

Figure 2:
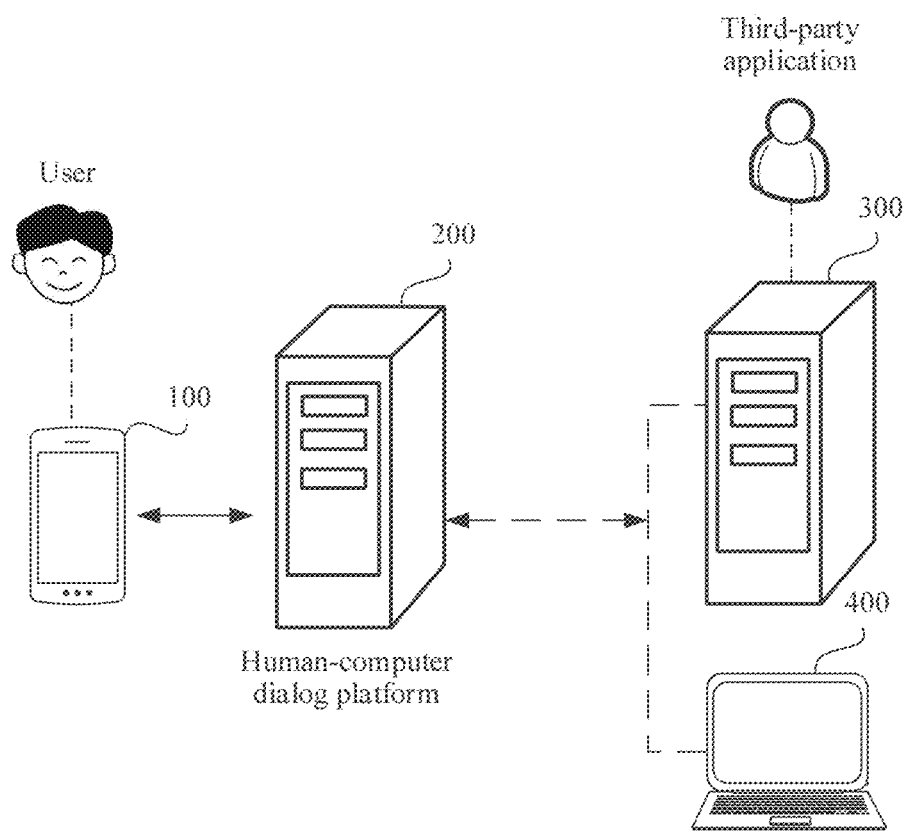
FIG. 2 is a schematic diagram 1 of components of a human-computer dialog system according to an embodiment of this application.

The human-computer interaction method provided in the embodiments of this application may be applied to a human-computer dialog system shown in FIG. 2. The human-computer dialog system includes an electronic device 100 and one or more servers 200 (for example, a chatbot). The electronic device 100 may be connected to the server 200 through a telecommunications network (a communications network such as a 3G/4G/5G communications network), a Wi-Fi network, or the like. This is not limited in the embodiments of this application.

A user may make a human-computer dialog with the server 200 by using the electronic device 100. The electronic device 100 may be a mobile phone, a tablet computer, a personal computer (Personal Computer, PC), a personal digital assistant (personal digital assistant, PDA), a smartwatch, a netbook, a wearable electronic device, an augmented reality (Augmented Reality, AR) device, a virtual reality (Virtual Reality, VR) device, a vehicle-mounted device, a smart automobile, a smart speaker, and the like. A specific form of the electronic device 100 is not particularly limited in this application.

The server 200 may provide a human-computer dialog service for the electronic device 100, and may recognize a user intention based on user discourse input by the electronic device, to learn of a user requirement and provide a corresponding service for the user. The server 200 may be a server of a vendor of the electronic device 100, for example, may be a cloud server of a voice assistant on the electronic device 100. Alternatively, a server 300 may be a server corresponding to another application. This is not limited in the embodiments of this application.

In some embodiments, the server 200 may further establish communication connections to servers 300 corresponding to one or more third-party applications, so that the server 200 sends a corresponding service request to a server 300 corresponding to a corresponding third-party application after learning of a user requirement, and returns response information of the server 300 corresponding to the third-party application to the electronic device 100. In some other embodiments the server 200 may further establish a communication connection to an electronic device 400 with a third-party application, so that a developer or a manager of the third-party application logs in to the server 200 by using the electronic device 400, to configure and manage a service provided by the third-party application.

Figure 3:
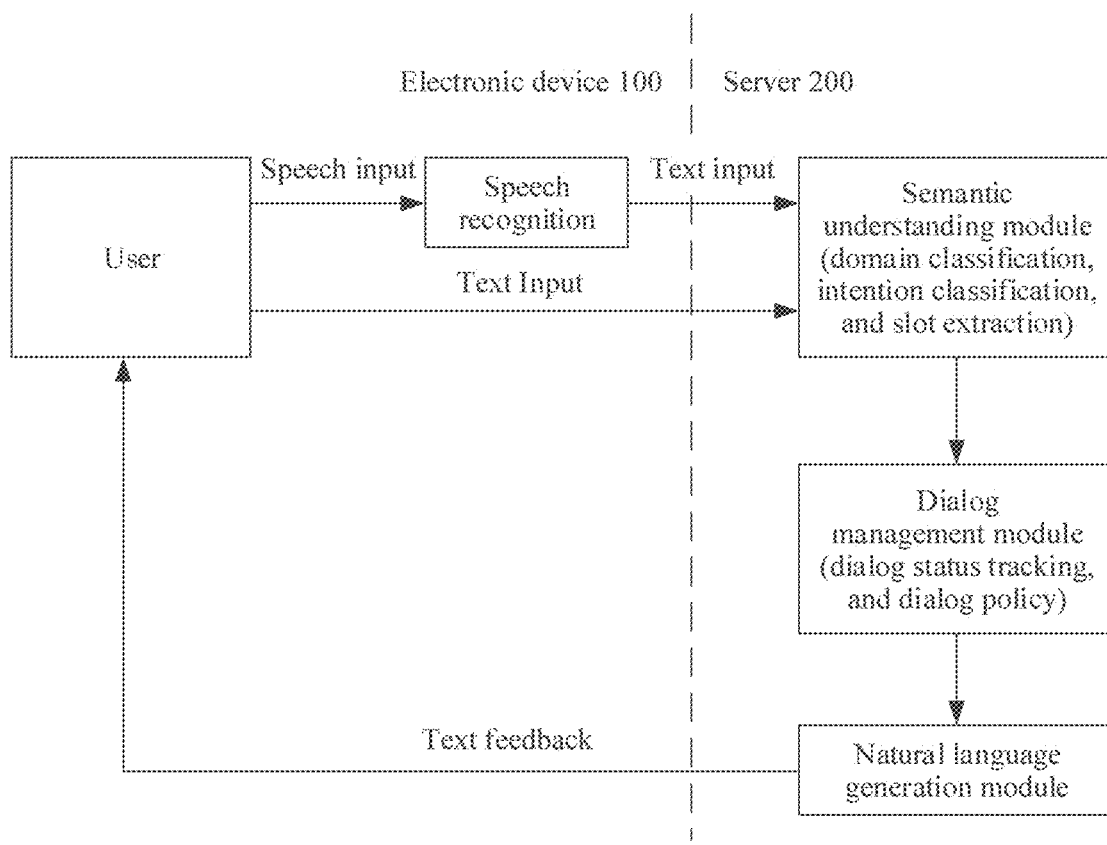
FIG. 3 is a schematic diagram 2 of components of a human-computer dialog system according to an embodiment of this application.

FIG. 3 is a framework diagram of another human-computer dialog system according to an embodiment of this application. With reference to the framework diagram, the following first briefly describes a human-computer interaction process applicable to the embodiments of this application.

First a user may input a user statement (which may be in a speech form or a text form) into the server 200 through the electronic device 100. If the user statement is in the speech form, the electronic device 100 may convert the user statement in the speech form into a user statement in the text form, and then send the user statement in the text form to the server 200, or the server 200 may convert the user statement in the speech form into a user statement in the text form. This is not limited in this embodiment of this application.

After the server 200 receives the user statement sent by the electronic device 100, a natural language understanding (Natural Language Understanding, NLU) module in the server 200 first performs semantic understanding on the user statement. Specifically, when the user statement is processed by the natural language understanding module, the user statement needs to be processed by three submodules: a field classification module, an intention classification module, and a slot extraction module. Generally, the server 200 integrates a plurality of specific task scenarios, for example, a meal ordering scenario, a ride-hailing scenario, and a weather checking scenario. Therefore, the field classification module may first recognize a specific task scenario to which the user statement belongs, and distribute the user statement to the specific task scenario. An intention recognition module may recognize a user intention and distribute the user statement to a sub-scenario in the specific task scenario. The slot extraction module may recognize an entity (entity) from the user statement and perform slot filling (Slot Filling). For example, named entity recognition (Named Entity Recognition, NER) may be used to recognize an entity having a specific meaning in the user statement, such as a person name, a place name, a time, a date, an institution name, an organization name, or a monetary value. It may be simply understood that a feature of each word extracted from the user statement is compared with a predefined feature of each entity, to recognize a corresponding entity from the user statement.

For example, the dialog shown in FIG. 1B is still used as an example for description. The field classification module may determine, based on "Call a car for me" of the user, that a ride-hailing task needs to be executed for the user (sub-scenarios may further include a private car task, an express task, and a ride-sharing task). Then, the intention classification module may determine to execute the express task for the user based on "DiDi express" of the user. Then, the slot extraction module may extract information corresponding to a destination slot as "Shenzhen Bay Park" and information corresponding to a departure time slot as "8:30". It should be noted that, in FIG. 1B, the user does not say information corresponding to a departure place slot, and the slot extraction module may extract, as the information corresponding to the departure place slot, a default departure place set by the user, or the slot extraction module performs positioning by using a GPS, and uses a positioned location as the information corresponding to the departure place slot.

An output of the natural language understanding module is used as an input of a dialog management (Dialog Management) module. The dialog management module includes a status tracking module and a dialog policy module. The status tracking module includes various types of information of a continuous dialog, and updates a current dialog status based on a previous status, a user status (information output by the natural language understanding module), and a system status (that is, based on querying in a database). A dialog policy is closely related to a task scenario and is usually used as an output of the dialog management module, for example, may be a questioning mechanism for a missing mandatory slot.

In the embodiments of this application, the dialog policy further includes a confirmation mechanism for a missing optional key slot. Specifically, the confirmation mechanism for a missing optional key slot and the questioning mechanism for a missing mandatory slot may be executed in parallel or in serial. In other words, an execution sequence of the confirmation mechanism and the questioning mechanism is not limited in the embodiments of this application.

A specific confirmation mechanism is to be described in detail in the following embodiments, and details are not described herein.

A natural language generation (Natural Language Generation, NLG) module generates text information based on the output of the dialog management module, and feeds back text information to the user, that is, completes the human-computer interaction process with the user. The natural language generation module may generate a natural language in a template-based, syntax-based, or model-based manner, or the like. In the template-based manner and the syntax-based manner, a rule-based policy is mainly used, and in the model-based manner, for example, a long short-term memory (Long Short-Term Memory, LSTM) may be used. A specific implementation of generating the natural language is not limited in the embodiments of this application.

Figure 4:
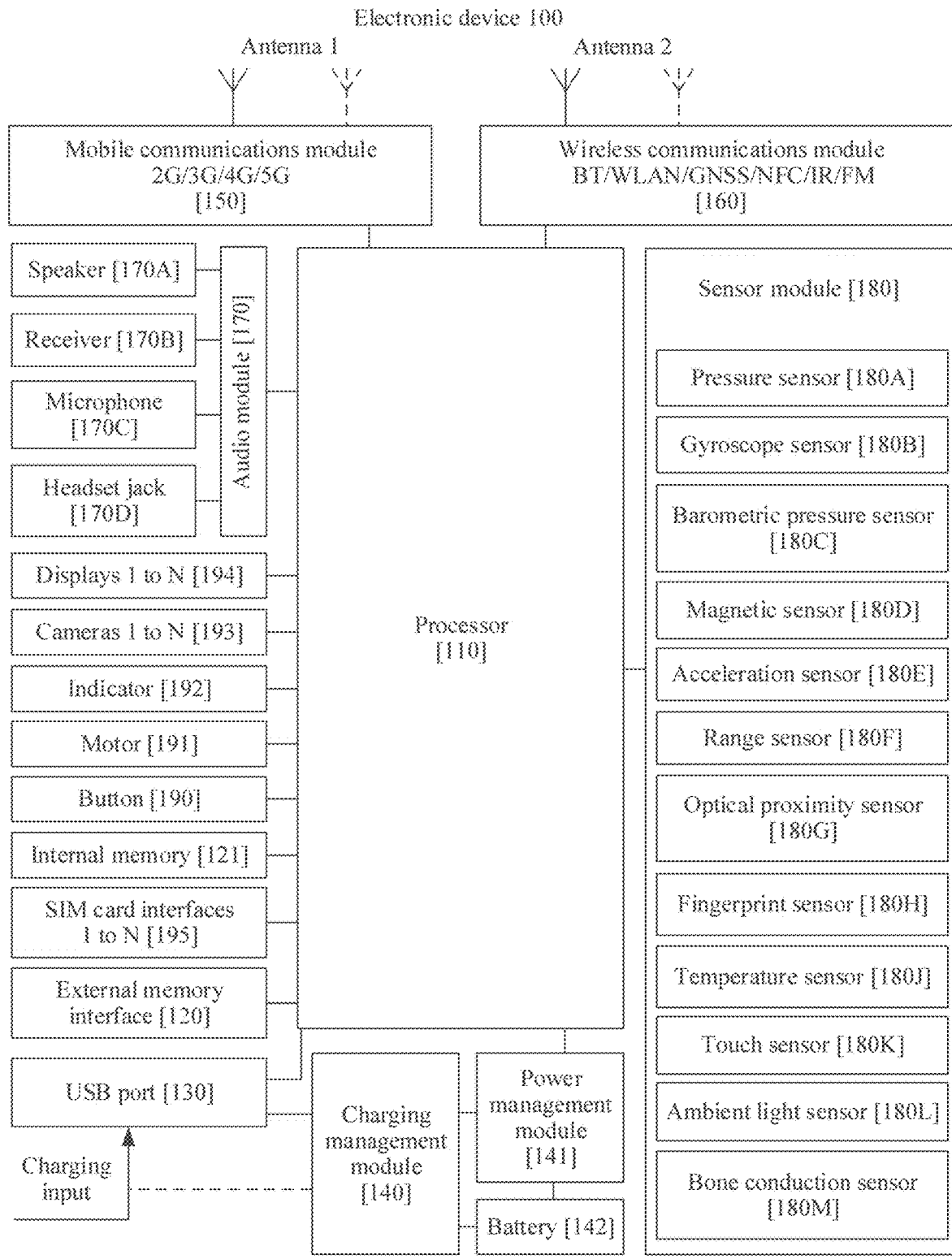
FIG. 4 is a schematic structural diagram of an electronic device according to an embodiment of this application.

FIG. 4 is a schematic structural diagram of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, buttons 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in the embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-processing unit, NPU). Different processing units may be independent devices, or may be integrated into one or more processors.

The controller may be a nerve center and a command center of the electronic device 100. The controller may generate an operation control signal based on an instruction operation code and a time sequence signal, to control to read an instruction and execute an instruction.

A memory may be further disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or the data again, the processor 110 may directly invoke the instruction or the data from the memory, to avoid repeated access. This reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input-output (general-purpose input/output, GPIO) interface, a subscriber identification module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (Serail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interlace may also be configured to: perform audio communication, and sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interlace is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments the processor 110 communicates with the camera 193 through the CSI interface, to implement a photographing function of the electronic device 100. The processor 110 communicates with the display 194 through the DSI interlace, to implement a display function of the electronic device 100.

The GPIO interface may be configured by using software. The GPIO interface may be configured as a control signal, or may be configured as a data signal. In some embodiments the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type-C port, or the like. The USB interface 130 may be configured to connect to the charger to charge the electronic device 100, or may be configured to transmit data between the electronic device 100 and a peripheral device, or may be configured to connect to a headset to play audio through the headset, or may be configured to connect to another electronic device such as an AR device.

It may be understood that an interface connection relationship between the modules shown in the embodiments of the present invention is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device through the power management module 141 when the battery 142 is charged.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as battery power, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 each are configured to transmit and receive an electromagnetic wave signal. Each antenna in the electronic device 100 may be configured to cover one or more communications bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution, for example, including 2G/3G/4G/5G wireless communication, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution, for example, including a wireless local area network (wireless local area networks, WLAN) (for example, a wireless fidelity (wireless fidelity, Wi-Fi) network), Bluetooth (bluetooth, BT), a global navigational satellite system (global navigation satellite system, GNSS), frequency modulation (frequency modulation, FM), a near field communication (near field communication, NFC) technology, or an infrared (infrared, IR) technology that is applied to the electronic device 100. The wireless communications module 160 may be one or more devices integrating at least one communications processing module.

The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division synchronous code division multiple access (time-division synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite-based augmentation system, SBAS).

The electronic device 100 implements the display function through the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute a program to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to processing the digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of coding formats, for example, MPEG (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes an instruction. The processor 110 runs the instruction stored in the internal memory 121, to implement various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 100 may implement audio functions such as music playback and recording functions through the audio module 170, the speaker 170A, the receiver 170B, the microphone 170C the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice. The microphone 170C, also referred to as a "mike" or a "microphone", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce a noise, identify a sound source, implement a directional recording function, and the like. The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines a pressure strength based on a capacitance change. When a touch operation is performed on the display 194, the electronic device 100 detects a strength of the touch operation through the pressure sensor 180A. The electronic device 100 may also calculate a touch position based on a detection signal of the pressure sensor 180A. In some embodiments, touch operations that are performed at a same touch position but have different touch operation strengths may correspond to different operation instructions. For example, when a touch operation whose touch operation strength is less than a first pressure threshold is performed on an icon of Messages, an instruction for viewing an SMS message is executed. When a touch operation whose touch operation strength is greater than or equal to the first pressure threshold is performed on the icon of Messages, an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario.

The barometric pressure sensor 180C is configured to measure barometric pressure. In some embodiments, the electronic device 100 calculates an altitude based on an atmospheric pressure value obtained by the barometric pressure sensor 180C through measurement, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip cover through the magnetic sensor 180D, to set a feature such as automatic unlocking through flipping based on a detected opening or closing state of the flip cover.

The acceleration sensor 180K may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to applications such as a pedometer and switching between a landscape mode and a portrait mode.

The range sensor 180F is configured to measure a distance. The electronic device 100 may measure a distance in an infrared manner or a laser manner. In some embodiments, in a photographing scenario, the electronic device 100 may measure a distance through the range sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light through the light-emitting diode. The electronic device 100 detects infrared reflected light from a nearby object through the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, through the optical proximity sensor 180G, that the user holds the electronic device 100 close to the ear to make a call. In this case, the electronic device 100 automatically turns off the screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of the processor nearby the temperature sensor 180J, to reduce power consumption for thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142 to prevent abnormal power-off caused by a low temperature.

The touch sensor 180K is also referred to as a "touch panel". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. The display 194 provides a visual output related to the touch operation. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in a headset, to constitute a bone conduction headset. The audio module 170 may obtain a speech signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The buttons 190 include a power button, a volume button, and the like. The buttons 190 may be mechanical buttons, or may be touch buttons. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. Touch operations performed on different areas on the display 194 may correspond to different vibration feedback effects of the motor 191. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be used to indicate a charging status and a power change, or may be used to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be in a same type or different types. The SIM card interface 195 may also be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

For a structure of the electronic device 400, refer to the structure of the electronic device 100 shown in FIG. 4. Details are not described again.

All technical solutions in the following embodiments may be implemented in the electronic device 100, the server 200, or the electronic device 400 that has the foregoing hardware architecture.

The technical solutions provided in the embodiments of this application are described below in detail with reference to the accompanying drawings.

First, a skill developer (which may be a developer, a service provider, or the like of a third-party application) may log in to the server 200 by using the electronic device 400, to configure a new service. A service may alternatively be referred to as a skill on a human-computer dialog platform.

FIG. 5 to FIG. 8 show some interfaces to be used in a process of configuring a new skill by the skill developer. To configure the new skill, the skill developer needs to perform the following steps:

1. Set basic information of the new skill.

The skill developer may log in to a skill management page of the human-computer dialog platform through the electronic device 400, and start to configure the new skill. For example, the skill developer may enter, in a browser of the electronic device 400, a URL associated with the human-computer dialog platform, to log in to the skill management page. Alternatively, the skill developer may log in to the skill management page through a corresponding app.

Figure 5A:
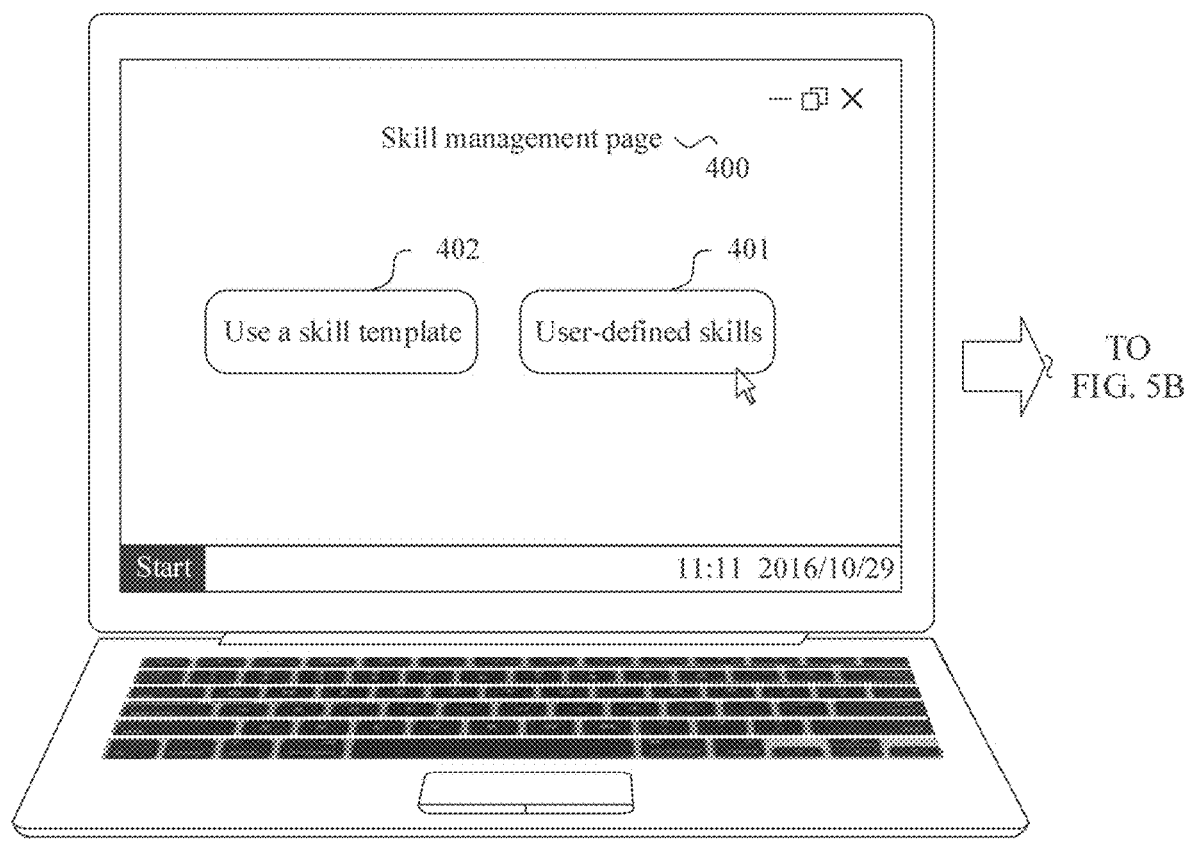
FIG. 5A to FIG. 5C are a schematic diagram of some interfaces of an electronic device according to an embodiment of this application.

FIG. 5A shows a home page 400 of the skill management page. The home page 400 may include a control 401 and a control 402. Skill templates are provided on the human-computer dialog platform. These templates cover some application scenarios. The skill developer may modify these templates to meet a personalized requirement of the skill developer. In some embodiments, the skill developer may select the control 402 to configure the new skill by using a skill template provided on the human-computer dialog platform. In some other embodiments, the skill developer may select the control 401 and said a user-defined skill based on a service provided by the skill developer, to provide voice interaction and a corresponding service for an end user. The following provides description by using an example in which the skill developer selects the control 401 and adds a user-defined skill.

Figure 5B:
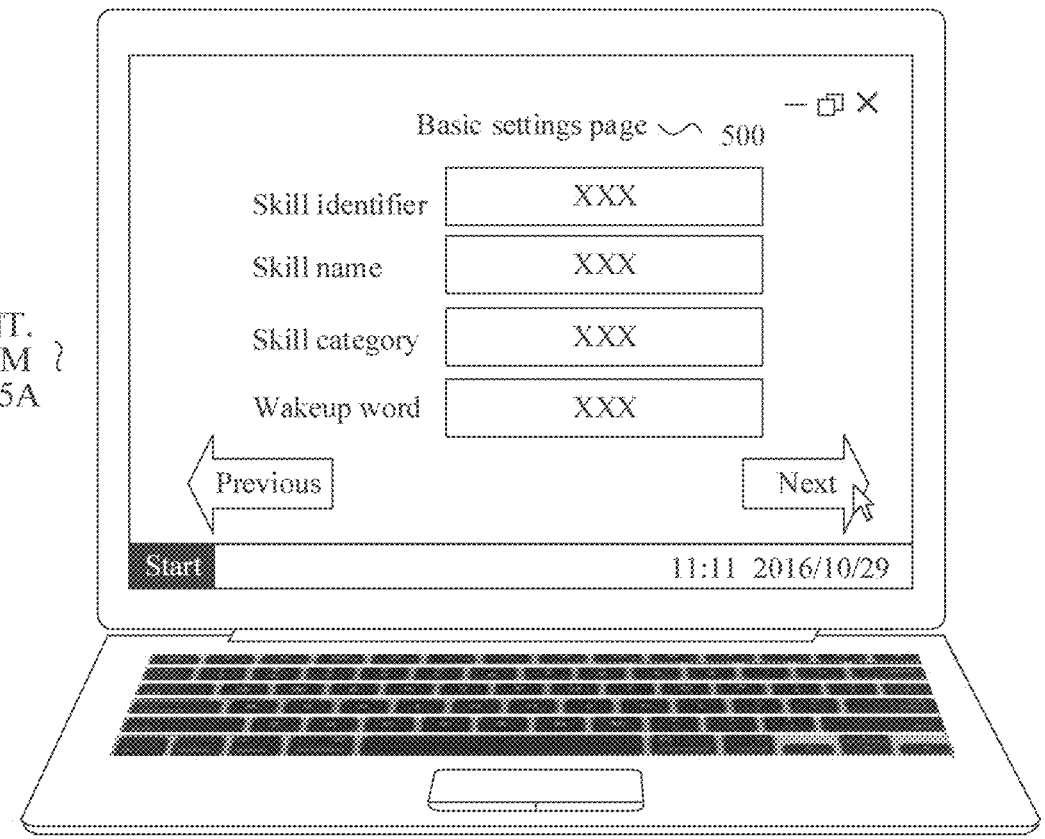

After detecting that the skill developer selects the control 401, the electronic device 400 enters an interface for adding a user-defined skill. FIG. 5B shows a page 500 for setting basic information of the new skill. The basic information such as a skill identifier, a skill name, a skill category, and a wakeup word of the new skill may be set on the page 500.

A skill identifier is a globally unique identifier of a skill, and a skill identifier of each skill cannot be repeatedly used. A skill name is a descriptive name of the skill, to facilitate the skill developer to manage created skills, and there is no requirement on whether the skill name is repeatedly used. The skill developer needs to select a category (which may also be understood as the specific scenario described above) for each skill for searching and screening during mapping of user discourse. Each skill may belong to only one category. Accurate skill category selection helps quickly and accurately map user discourse to an intention in a skill. A wakeup word may be understood as another name of a skill. After a user says the another name, the human-computer dialog platform can quickly obtain a service corresponding to the skill.

It may be understood that, the setting of the basic information of the new skill may further include other content, which is not listed we by one.

2. Create an intention in the new skill.

Figure 5C:
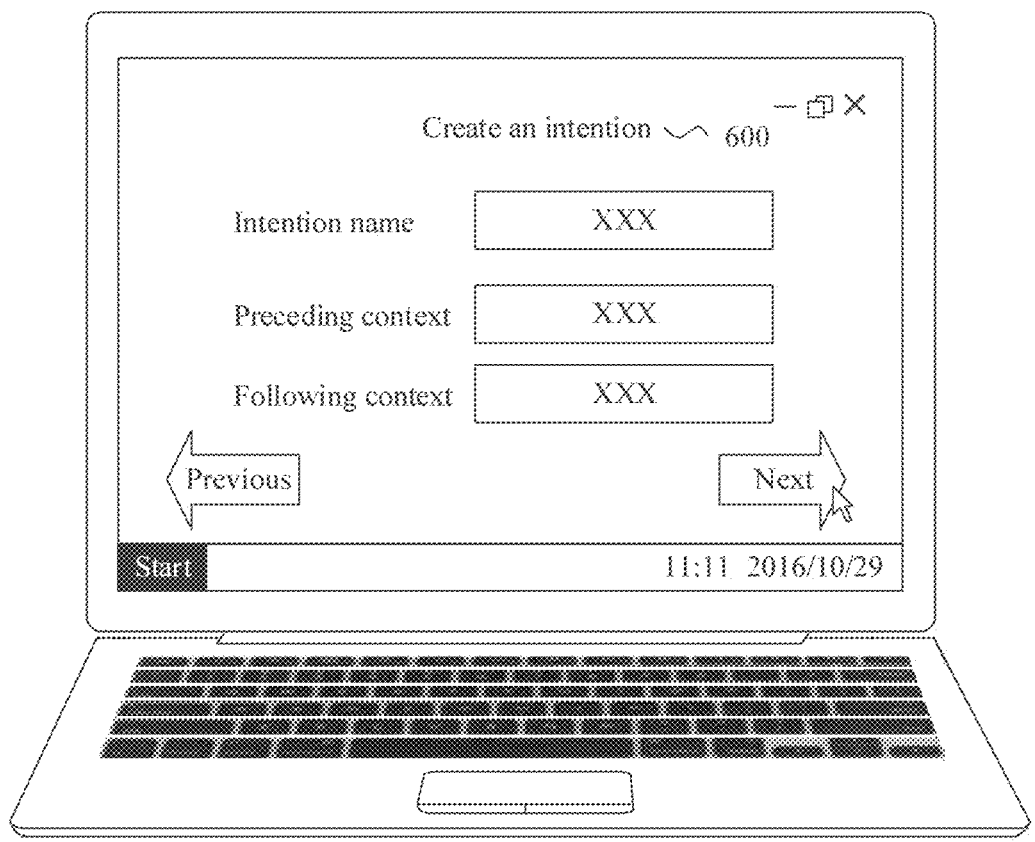

After setting the basic information of the new skill, the skill developer may start to create the intention in the new skill. FIG. 5C shows an intention creation page 600 displayed on the electronic device 400. The page 600 may include an intention name, a preceding context, a following context, and the like.

The intention name cannot be repeatedly used in the skill. The contexts are mainly used in a multi-round dialog scenario. The preceding context is used to trigger a current intention, and the following context is used to associate a next intention.

It should be noted that each sentence of the user corresponds to a user intention, and the user intention is a purpose of saying the sentence by the user. Each skill includes several intentions. Each sentence of the user is mapped to an intention in the skill for learning of a user requirement, so that a corresponding service is provided. When using this skill, the user expresses an intention in various ways. Therefore, the skill developer needs to input as many expressions (that is, user discourse) as possible that are used by the user to express the intentions in daily life during intention configuration, in this way, the intention can be recognized more accurately.

3. Input user discourse and mark slots in the user discourse (including setting a slot attribute and associating a slot type).

Figure 6A:
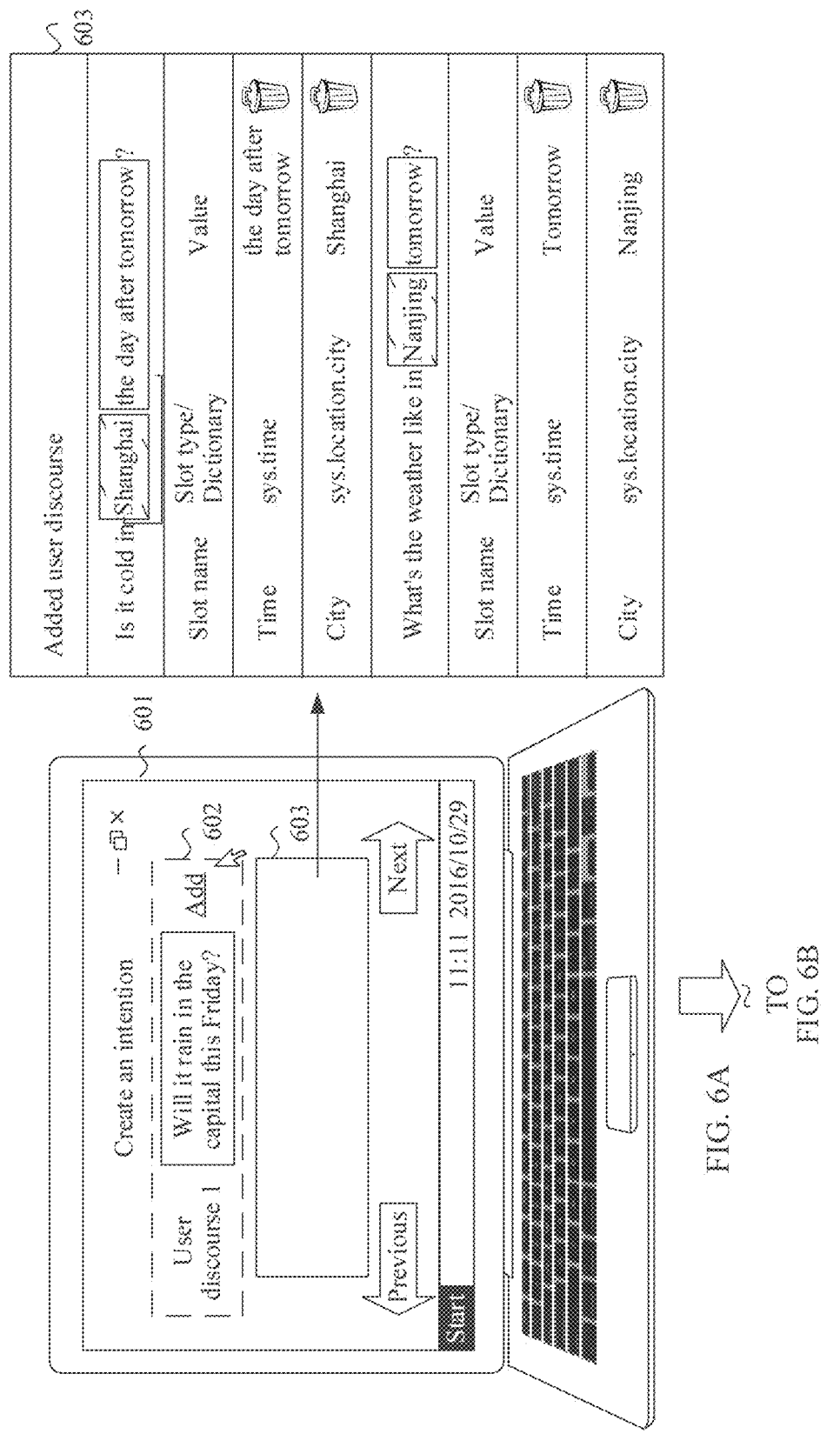
Figures 8A, 8B:
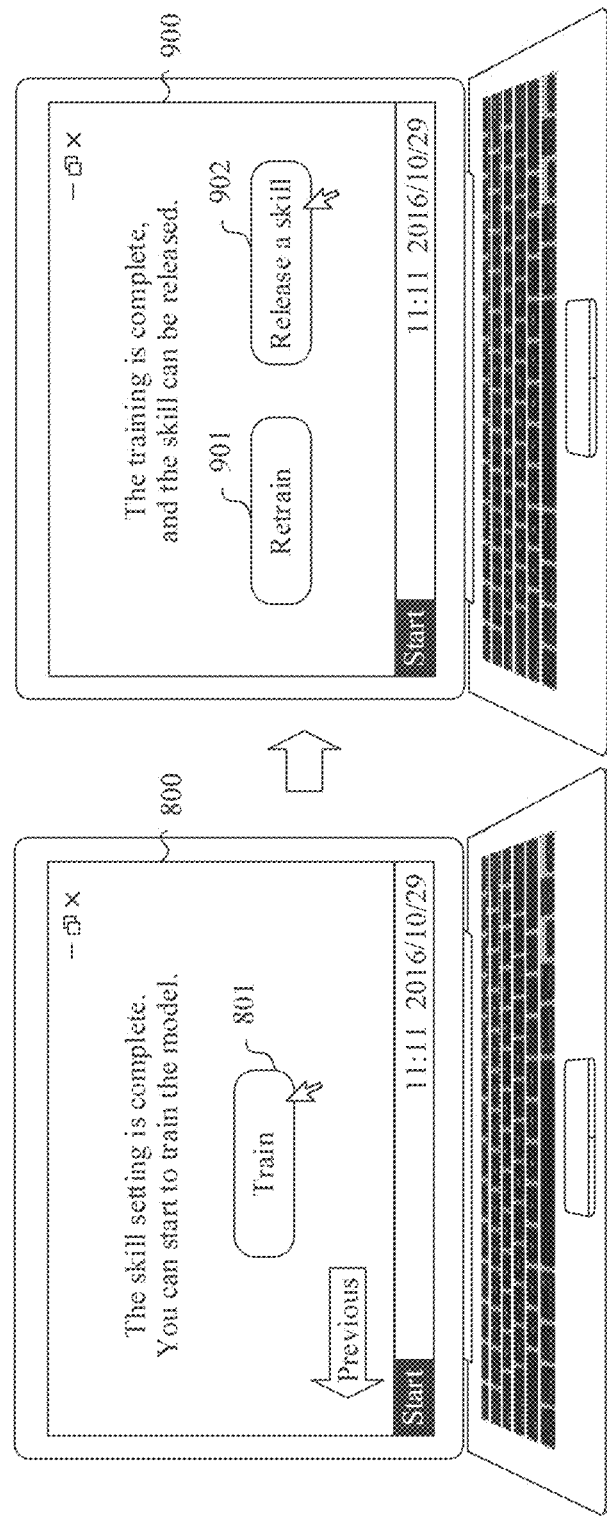
FIG. 8A and FIG. 8B are a schematic diagram of some other interfaces of an electronic device according to an embodiment of this application.

FIG. 6A shows a user discourse setting page 601 on the intention creation page displayed on the electronic device 400. The page 601 may include one or more user discourse adding controls 602. The page 601 may further display an information item 603 of existing user discourse.

The skill developer may input new user discourse in a text box of the control 602 and click a function button "add", to add the user discourse. In some embodiments, the human-computer dialog platform may automatically recognize an entity from the added user discourse, and associate the recognized entity with a slot and a slot type. In some other embodiments, if the human-computer dialog platform does not automatically mark a slot or incorrectly marks a slot, the skill developer may choose to manually mark the slot, and associate the marked slot with a slot type.

The slot is key information that is used to express an intention in the user discourse, and may be understood as a keyword in the user discourse. One slot corresponds to one slot type, and a value of the slot may be filled with another word of this slot type. The slot type may be understood as a set of words in a field. Information corresponding to the slots in the user discourse is of various slot types, and a word of a same slot type may be replaced, recognized, and extracted from corresponding slot information.

For example, in response to an operation that the skill developer inputs new user discourse in the text box in the control 602 and clicks the function button "add", the electronic device 400 pops up a dialog box 604 shown in FIG. 6B. The skill developer may view and modify slots marked in the user discourse and associated slot types in the dialog box 604. A slot type adding control 605 may be further displayed in the dialog box 604, so that a corresponding slot type can be added when no proper slot type can be selected during slot type association. A slot list viewing control 606 may be further displayed in the dialog box 604. In response to clicking the control 606 by the skill developer, the electronic device 400 displays a page 608 shown in FIG. 6C. The page 608 shows information such as the slots included in the user discourse, the slot types associated with the slots, attributes of the slots (a mandatory slot, an optional key slot, and an optional non-key slot), and questions to be asked when information corresponding to a slot is missing. The page 608 may further include a new slot adding control 607, and the control 607 may be used to add a slot in the user discourse.

Generally, on the page 608, the skill developer may configure a questioning mechanism for a mandatory slot, configure a confirmation mechanism for an optional key slot, and does not set a question for an optional non-key slot. That is, when a slot is set to a mandatory slot or an optional key slot, a question is set for the slot, the question may be a default question, or may be a question customized by the skill developer. When a slot is set to an optional non-key slot, a question in the slot is set to "None" by default and cannot be changed. For another example, the new user discourse is "Will it rain in foe capital this Friday?". Marked slots include a time slot and a city slot. A slot type corresponding to the time slot is sys.time, and an attribute of the time slot is an optional key slot. To be specific, when the human-computer dialog platform fails to extract information corresponding to the time slot, the human-computer dialog platform actively asks the user a "question 1", and the user determines whether the information corresponding to the time slot is necessary. If the information corresponding to the time slot is necessary; the human-computer dialog platform extracts the information corresponding to the time slot from an answer of the user, and then performs a subsequent operation. If the information corresponding to the time slot is unnecessary, the human-computer dialog platform considers that there is no information corresponding to the time slot, and directly performs a subsequent operation.

A slot type corresponding to the city slot is sys.local.city, and an attribute of the city slot is a mandatory slot. To be specific, when the human-computer dialog platform fails to extract information corresponding to the city slot, the human-computer dialog platform actively asks the user a "question 2". Then, the human-computer dialog platform extracts the information corresponding to the city slot from an answer of the user, and then performs a subsequent operation.

Another optional non-key slot may also be marked in the added user discourse. To be specific, when the human-computer dialog platform fails to extract information corresponding to the optional non-key slot, the human-computer dialog platform considers that there is no information corresponding to the optional non-key slot, and directly performs a subsequent operation.

In the embodiments of this application, the slot type mainly includes a system slot type and a user-defined slot type (which may also be referred to as a user dictionary). The system slot type is a slot type preset by the human-computer dialog platform, and words of the system slot type are innumerable, for example, sys.time, sys.location.city, sys.name, and sys.phoneNum. The user-defined slot type is defined by the skill developer, and a quantity of words of the user-defined slot type is limited.

FIG. 7 shows a slot type editing page 700 displayed on the electronic device 400. The skill developer may input a text of an added user-defined slot type in a text box 701 and press Enter. The skill developer may input a value of the added user-defined slot type below a value item 702, may input a synonym below a synonym item 703 corresponding to the added user-defined slot type, and then click a "save" button. In this way, the user-defined slot type is added. A user-defined slot type may further be modified, deleted, and so on by using a plurality of controls show n in an area 704 in the slot type editing page 700. In some embodiments, the slot type editing page 700 may further support batch addition of slot types. For example, the skill developer may click a batch adding button 705 and select to upload a file of a specified file type or a file in a specified file format to add slot types in batches. The file of the specific file type or the file in the specific file format includes one or more pieces of information corresponding to a to-be-added slot type. This is not limited in this embodiment of this application.

4. After the new skill is set, train and release a human-computer dialog model corresponding to the new skill.

After the skill developer inputs the user discourse required by the new skill, and performs marking, attribute setting, and slot type association on the slots in the user discourse, the electronic device 400 may display a page 800. The skill developer may click a control 801 "start training" to notify the human-computer dialog platform to start training the human-computer dialog model corresponding to the new skill. The human-computer dialog model that corresponds to the new skill and that is trained by the human-computer dialog platform may include a field classification model, an intention classification model, a slot extraction model and the like. The field classification model may be used to perform field classification on the user discourse. The intention classification model may be used to perform further field classification on the user discourse, to recognize an intention in the new skill corresponding to the user discourse. The slot extraction model may be used to extract information corresponding to a slot in the user discourse. In this way, a subsequent operation corresponding to the user intention output by the intention classification model can be performed based on the user intention and the information that corresponds to the slot and that is output by the slot extraction model.

After the human-computer dialog platform generates the human-computer dialog model corresponding to the new skill, the electronic device 400 may display a page 900. The skill developer may click a control 902 "release a skill" to notify the human-computer dialog platform to release the new skill, and push the human-computer dialog model corresponding to the new skill to the human-computer dialog platform. Then, another terminal may make a dialog with the human-computer dialog platform, to obtain the new skill provided by the human-computer dialog platform. The page 900 may further include a control 901 "retrain", and the skill developer may retrain, by using the control 901, a human-computer dialog model corresponding to the new skill.

Figure 9A:
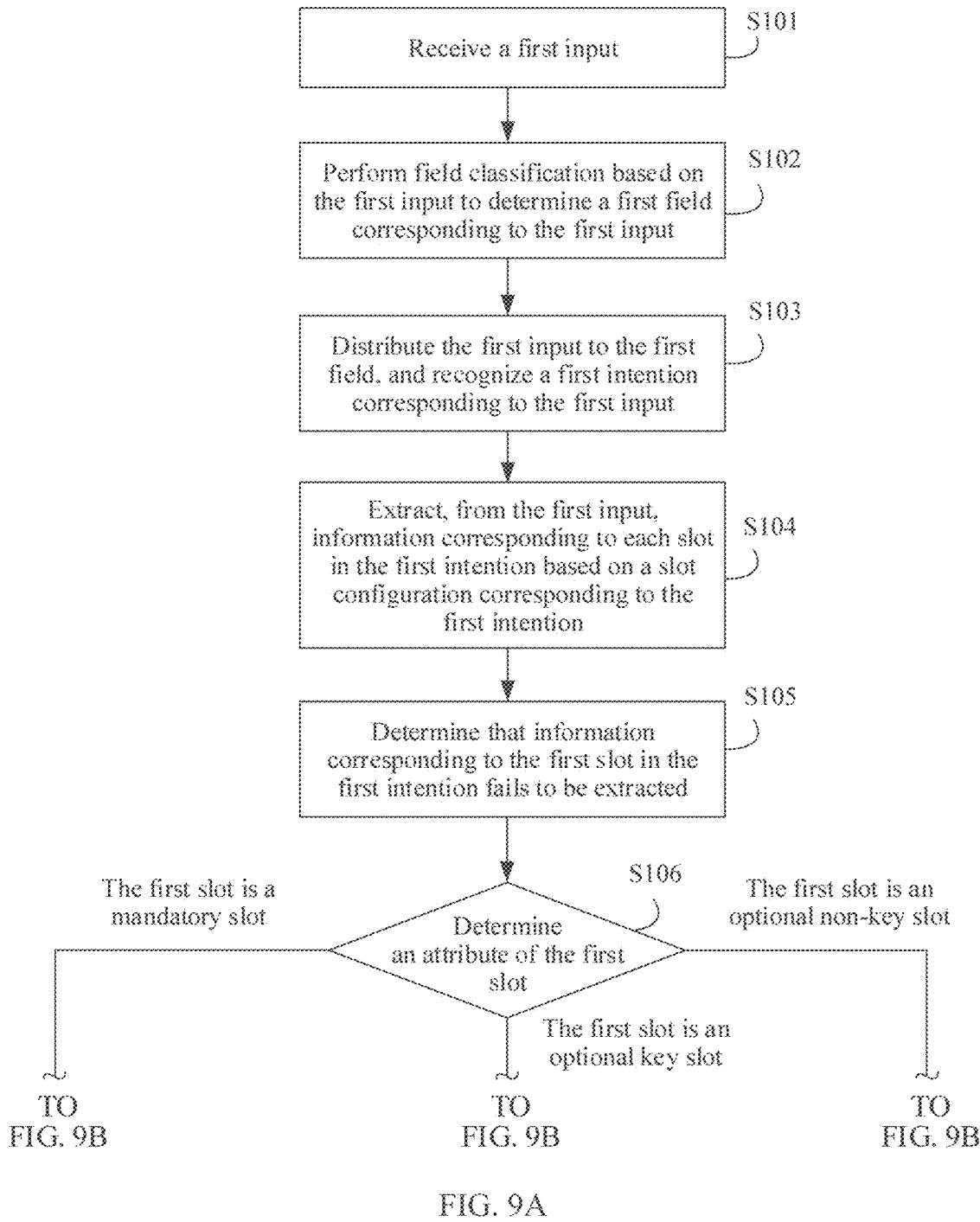
FIG. 9A and FIG. 9B are a schematic flowchart 1 of a human-computer interaction method according to an embodiment of this application.
Figure 9B:
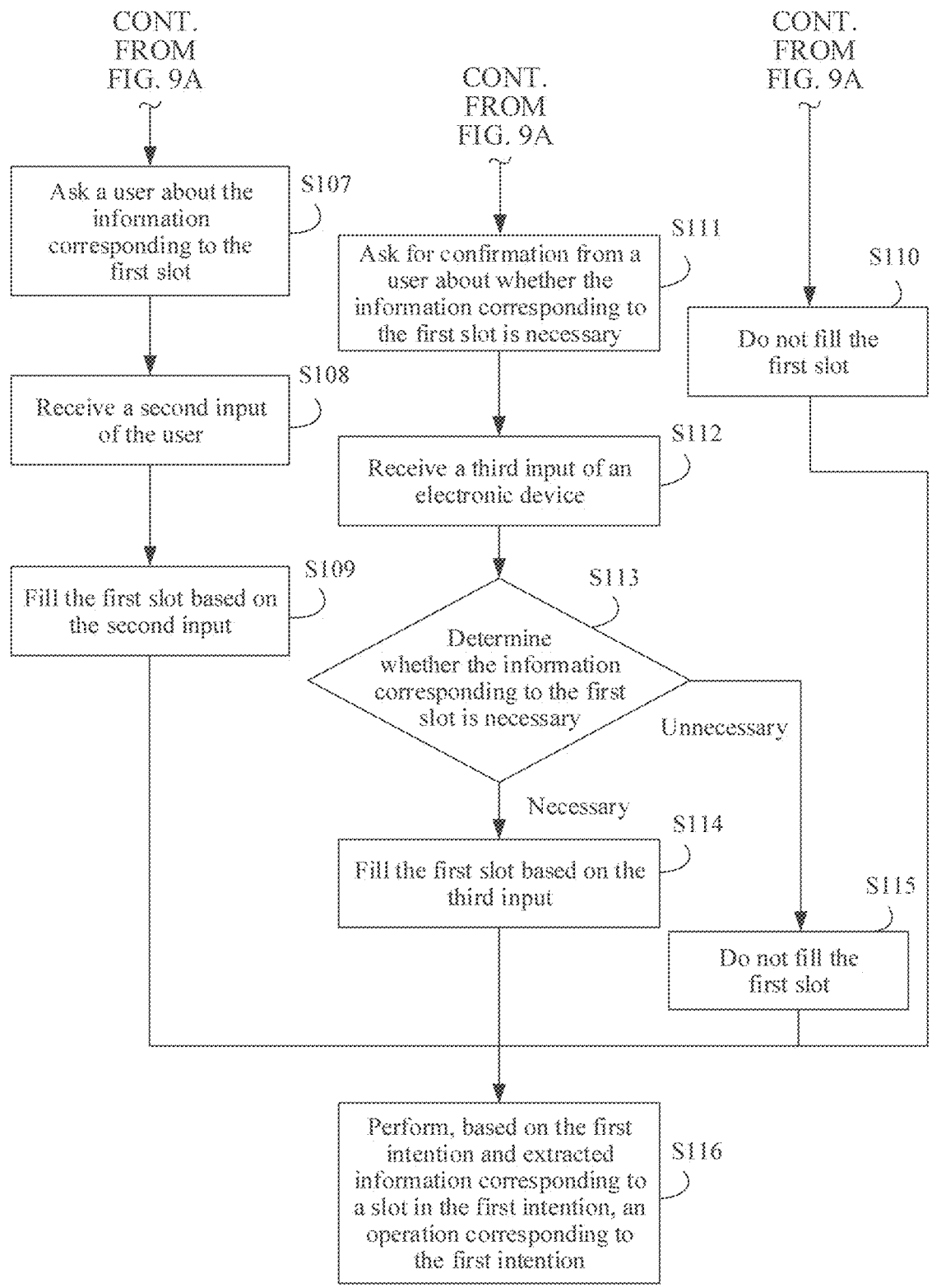

FIG. 9A and FIG. 9B show a human-computer interaction method according to an embodiment of this application. The method may be used in interaction between an electronic device 100 and a server 200. The method specifically includes the following steps.

S101. The server 200 receives a first input.

When using the electronic device 100 to perform dialog interaction with the server 200, a user may put forward a corresponding service requirement to the server 200 in a speech form or a text form. If the user inputs speech, the server 200 may recognize the speech by using an automatic speech recognition module, convert the speech into a text, namely, the first input, and input the first input into a natural language understanding module. If the user inputs a text, the server 200 uses the text input by the user as the first input, and inputs the first input into the natural language understanding module.

The first input may be one piece of discourse in a single round of dialog between the user and the server 200, or may be a plurality of pieces of discourse in a plurality of rounds of dialogs between the user and the server 200. This is not limited in this embodiment of this application.

S102. The server 200 performs field classification based on the first input to determine a first field corresponding to the first input.

The first input corresponds to a user intention. That is, the user wants the server 200 to provide a service or perform some operations. A field classification module in the natural language understanding module may perform searching and screening based on the first input, to determine a specific task scenario (that is, the first field) to which the user intention in the first input belongs, and distribute the first input to the specific task scenario (that is, the first field).

S103. The server 200 distributes the first input to the first field, and recognizes a first intention corresponding to the first input.

An intention recognition module in the natural language understanding module may further distribute the user intention in the first input to a sub-scenario of the specific task scenario, that is, recognize the user intention (that is, the first intention) corresponding to the first input.

S104. The server 200 extracts, from the first input, information corresponding to each slot in the first intention based on a slot configuration corresponding to the first intention.

The first intention is an intention in a skill on the server 200. When configuring the skill, a skill developer configures corresponding slots for the first intention in the skill, that is, slots that need to be extracted in the first intention, and attributes of the slots. Therefore, after the first intention corresponding to the first input is determined, a slot extraction module in the server 200 may find the slot configuration corresponding to the first intention.

The slot extraction module in the server 200 may recognize entities included in the first input, invoke a slot extraction model stored in the slot extraction module, perform an operation on these entities to determine slots that are in the first intention and that correspond to these entities, and mark these entities with labels of the corresponding slots. It may also be considered that these entities are determined as values of the corresponding slots. That is, information corresponding to these slots is extracted. For example, the slot extraction module recognizes an entity A from the first input, inputs the entity A into an algorithm corresponding to each slot in the slot extraction model, and calculates each a confidence level corresponding to the entity A. If a confidence level calculated after the entity A is input into an algorithm corresponding to a slot A does not meet a preset condition, for example, if the confidence level is less than a preset threshold, for example, a threshold C, it is considered that the entity A is not information corresponding to the slot A. If a confidence level calculated after the entity A is input into an algorithm corresponding to a slot B meets a preset condition, for example, if the confidence level is greater than or equal to the threshold C, it is considered that the entity A is information corresponding to the slot B.

It should be noted that, information corresponding to some slots may be set by the user by default, or may be information obtained in another manner, and is not necessarily extracted from the first input.

For example, the first intention is "air ticket booking", and a preset slot configuration of "air ticket booking" may include a time slot, a departure place slot, and a destination slot. If the user says "Book an air ticket to Shanghai tomorrow" (that is, the first input), the server 200 may recognize a plurality of entities from the first input, for example, "tomorrow" and "Shanghai". The server 200 may input "tomorrow" into an algorithm corresponding to the time slot in the slot extraction model for calculation, to learn that a confidence level of the time slot "tomorrow" meets the preset condition, and it may be considered that "tomorrow" is a value of the time slot in "air ticket booking". In other words, the server 200 extracts information corresponding to the time slot in the first intention. Similarly, the server 200 may input "Shanghai" into an algorithm corresponding to the destination slot in the slot extraction model for calculation, to learn that a confidence level of the destination slot "Shanghai" meets the preset condition, and it may be considered that "Shanghai" is a value of the designation slot in "air ticket booking". In other words, the server 200 extracts information corresponding to the destination slot in the first intention. There is no entity corresponding to the departure place slot in the first input. The user may obtain a current location of the electronic device 100 by using a GPS and uses the current location as a value of the departure place slot. Alternatively, the user may use an address that is set by the user by default, as a value of the departure place slot, and so on. In other words, the server 200 extracts information corresponding to the departure place slot in the first intention.

S105. The server 200 determines that information corresponding to a first slot in the first intention fail to be extracted.

When step S104 is performed, the first input may not include information corresponding to some slots in the first intention (for example, the user does not say the information, or the user says the information, but an automatic speech recognition error or a user input error occurs).

Alternatively, when the slot extraction model of the server 200 is inaccurate, the server 200 may fail to extract, from the first input, information corresponding to some slots in the first intention. In this case, step S106 and subsequent steps need to be performed.

S106. The server 200 determines an attribute of the first slot. The first slot may be a mandatory slot, an optional key slot, or an optional non-key slot. If the first slot is a mandatory slot, the server 200 performs step S107. If the first slot is an optional non-key slot, the server 200 performs step S110. If the first slot is an optional key slot, the server 200 performs step S111.

Specifically, the slot extraction module in the server 200 sends, to a dialog management module, a result that the information corresponding to the first slot fails to be extracted. The dialog management module determines the attribute of the first slot, to determine a subsequent operation based on the attribute of the first slot.

S107. The server 200 asks the user a question about the information corresponding to the first slot.

The dialog management module asks, based on the attribute of the first slot and a preset dialog policy, the user a question about the information corresponding to the first slot. For example, the server 200 may request the user to repeat, or may ask the user again a question that is previously exchanged with the user, or may ask a question about the missing first slot. Questioning content and a questioning manner are not limited in this embodiment of this application.

S108. The server 200 receives a second input.

The second input is an answer given by the user to the question of the server 200. If the user gives the answer in a speech form, the automatic speech recognition module in the server 200 may convert speech into a text, to obtain the second input. If the user gives the answer in a text form, the server 200 uses a text input by the user as the second input. The server sends the determined second input to the natural language understanding module.

The second input may be one piece of discourse in a single round of dialog between the user and the server 200, or may be a plurality of pieces of discourse in a plurality of rounds of dialogs between the user and the server 200. This is not limited in this embodiment of this application.

S109. The server 200 fills the first slot in the first intention based on the second input.

The slot extraction module in the natural language understanding module recognizes an entity from the second input, and invokes an algorithm that corresponds to the first slot and that is in the slot extraction model stored in the slot extraction module for calculation, to recognize an entity corresponding to the first slot. In other words, if the determined entity is used as a value of the first slot, it indicates that the information corresponding to the first slot is extracted. Then, step S116 is to be performed.

S110. The server 200 does not fill the first slot.

The slot extraction module in the natural language understanding module determines not to fill the first slot with the information corresponding to the first slot, that is, does not need to determine a value of the first slot. Then, step S116 is to be performed.

S111. The server 200 asks the user a question, to determine whether the information corresponding to the first slot is necessary.

In some embodiments of this application, after determining that the first slot is an optional key slot (that is, step S106), regardless of whether the user says the information corresponding to the first slot, the dialog management module may directly ask the user a question about the information corresponding to the first slot, and the user determines whether the first slot needs to be filled with the information corresponding to the first slot. A questioning manner and questioning content for the information corresponding to the first slot are not limited in this embodiment of this application.

In some other embodiments of this application, after determining that the first slot is an optional key slot (that is, step S106), the dialog management module may further determine whether the user has been likely to say the information corresponding to the first slot. If the user has been very likely to say the information corresponding to the first slot, the server 200 asks the user a question about the information corresponding to the first slot, and the user determines whether the first slot needs to be filled with the information corresponding to the first slot. In this way, targeted confirmation is asked tor from the user, to help reduce disturbance to the user. For a process in which the server 200 determines whether the user has been likely to say the information corresponding to the first slot, refer to the following description. Details are not described herein.

S112. The server 200 receives a third input of the electronic device.

The third input is an answer given by the user to the question of the server 200. If the user gives the answer in a speech form, the automatic speech recognition module in the server 200 may convert speech into a text, to obtain the third input. If the user gives the answer in a text form, the server 200 uses a text input by the user as the third input. The server sends the determined third input to the natural language understanding module.

The third input may be one piece of discourse in a single round of dialog between the user and the server 200, or may be a plurality of pieces of discourse in a plurality of rounds of dialogs between the user and the server 200. This is not limited in this embodiment of this application.

S113. The server 200 determines, based on the third input of the electronic device 100, whether the information corresponding to the first slot is necessary. If the information corresponding to the first slot is necessary, the server 200 performs step S114. If the information corresponding to the first slot is unnecessary, the server 200 performs step S115.

S114. The server 200 fills the first slot based on the third input.

For details, refer to step S109. Then, step S116 is to be performed.

S115. The server 200 does not fill the first slot.

Then, step S116 is to be performed.

S116. The server 200 performs, based on the first intention and the extracted information corresponding to the slot in the first intention, an operation corresponding to the first intention.

Figure 10A:
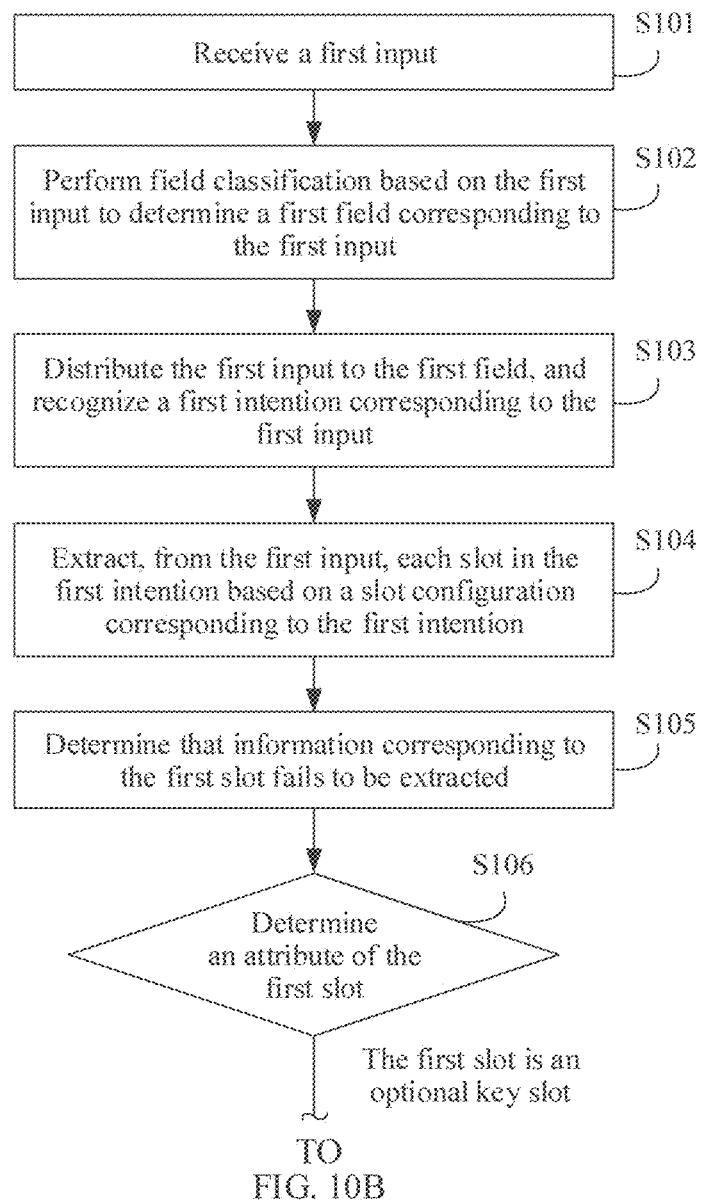
FIG. 10A and FIG. 10B are a schematic flowchart 2 of a human-computer interaction method according to an embodiment of this application.
Figure 10B:
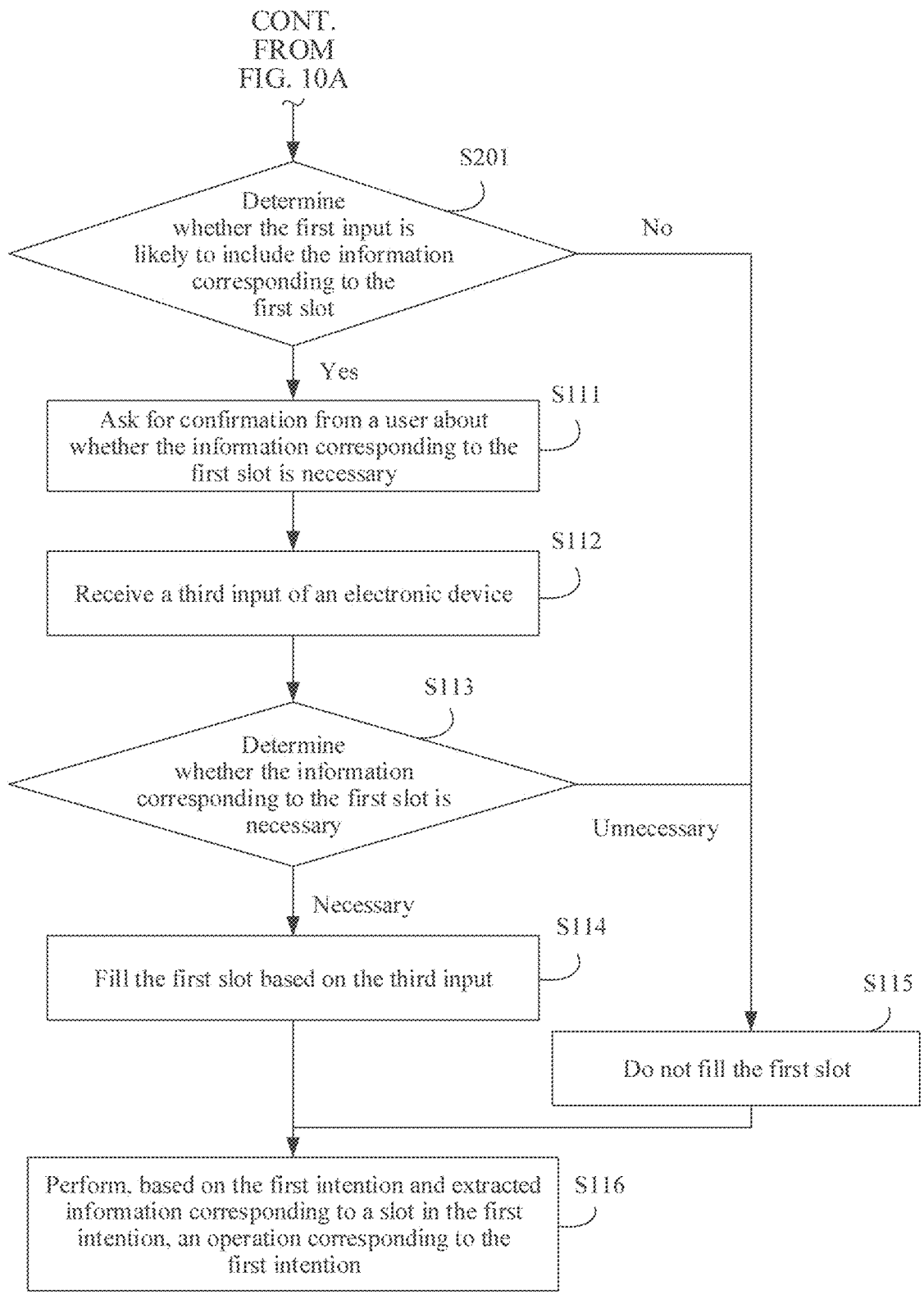

FIG. 10A and FIG. 10B are a schematic flowchart of another human-computer interaction method according to an embodiment of this application. The method further includes a process of determining whether a user has been likely to say information corresponding to a first slot. That is, after step S106 and before step S111, step S201 is further included and is specifically as follows:

S201. The server 200 determines whether the first input has been likely to include the information corresponding to the first slot. If the server 200 determines that the first input has been likely to include the information corresponding to the first slot, the server 200 performs step S111. If the server 200 determines that the first input is not likely to include the information corresponding to the first slot, the server 200 performs step S115.

For example, there may be the following two reasons why the user says the information corresponding to the first slot, but the server 200 fails to extract the information corresponding to the first slot:

Reason 1: The information corresponding to the first slot fails to be extracted due to a user input error or a speech recognition error. For example, it is assumed that there are two intentions on the server 200: An intention 1 is "open settings", and a corresponding operation is opening system settings. An intention 2 is "open WeChat settings", and a corresponding operation is opening settings of a WeChat application. If the user says "open WeChat settings", the server 200 may recognize the speech as "open WeCha settings" because of an accent or a pause of the user. In this case, the server 200 does not extract "WeCha". If the server 200 does not ask for confirmation from the user, the server 200 may directly recognize a user intention as "open settings". That is, the server 200 opens the system settings. This is different from the intention that the user expects to open the settings of the WeChat application.

Reason 2: When the user correctly expresses the information corresponding to the first slot, the information corresponding to the first slot may fail to be extracted because of an inaccurate slot extraction model. For example, the server 200 generates an inaccurate slot extraction model through training because relatively less user discourse is input or inaccurate user discourse is input before a skill developer trains the slot extraction model.

For the two different reasons, this embodiment of this application provides the following two methods, to determine whether the user has been likely to say the information corresponding to the first slot. Details are as follows:

Method 1 is used when the user input error or the speech recognition error occurs:

The server 200 may trigger a user confirmation mechanism only when the server determines, by using an error correction method, that an entity recognized from user discourse (that is, the first input) is relatively similar to a keyword in a user dictionary. When a similarity between the entity and the keyword in the user dictionary is to be determined, a Levenshtein distance between the entity recognized from the first input and the keyword in the user dictionary may be calculated by using, for example, an algorithm based on a pinyin similarity or an algorithm based on a character string similarity, to determine the similarity between the entity and the keyword in the user dictionary. Alternatively, a similarity between words or phrases may be calculated by using a deep learning word vector, a sentence vector, or the like. A similarity calculation method is not limited in this embodiment of this application.

The following describes, by using an example of calculating a Levenshtein distance, the method for determining the information that corresponds to the first slot and that may be included in the first input provided in this embodiment of this application. A Levenshtein distance (Levenshtein Distance) is a minimum quantity of editing operations required for converting one character string into another character string. The editing operation may include replacing one character with another character, inserting one character, or deleting one character.

First, it is determined whether the first slot corresponds to a system slot type or a user dictionary (that is, a user-defined slot type).

In some embodiments, the server 200 determines that the first slot corresponds to the user-defined slot type. Because a word of the user-defined slot type is user-defined, a quantity of words of the user-defined slot type is limited. Therefore, the server 200 may traverse all words of the user-defined slot type that correspond to the first slot, calculate Levenshtein distances between an entity determined in the user utterance and the words of the user-defined slot type, and determine a minimum Levenshtein distance from these Levenshtein distances. An entity that is in the first input and that corresponds to the minimum Levenshtein distance may be determined as a potential entity in the first slot, that is, may be the information corresponding to the first slot.

Optionally, the server 200 may determine whether the minimum value is less than a threshold A. The threshold A may be a threshold specified by a developer or the user. If the minimum value is less than the threshold A, it may be considered that the user does not say the information corresponding to the first slot. In other words, the first input does not include the information corresponding to the first slot. In this case, the server 200 may not ask for confirmation from the user. If the minimum value is greater than or equal to the threshold A, it may be considered that the user has been likely to say the information corresponding to the first slot. In this case, the server 200 may ask for confirmation from the user.

For example, a user intention is "book an air ticket to Shanghai tomorrow", but is incorrectly input as "book an air ticket to shangha tomorrow". The first intention is "book an air ticket", and the first intention includes a time slot, a departure place slot, and a destination slot. It is assumed herein that the destination slot corresponds to a user dictionary 1. The server 200 fails to recognize information corresponding to the destination slot, and the server 200 may recognize a plurality of entities from the first input for example, "tomorrow" and "shangha". The server 200 calculates a distance between "tomorrow" and each word in the user dictionary 1, calculates a distance between "shangha" and each word in the user dictionary 1, selects a word corresponding to a shortest distance. For example, a Levenshtein distance between "shangha" and "Shanghai" in the user dictionary 1 is the shortest. In this case, it may be determined that "shangha" is a potential entity in the first slot. Further, if a Levenshtein distance between "shangha" and a most similar word in the user dictionary 1 is greater than the threshold A, it is considered that "shangha" is likely to be the information that is said by the user and that corresponds to the first, slot. In this case, the server 200 may ask for confirmation from the user.

Optionally, the developer or the user may further set a threshold B, and the threshold B is greater than the threshold A. If the minimum value is greater than or equal to the threshold B, it indicates that the potential entity is very similar to a word of the user-defined slot type, and it may be basically considered that the user says the information corresponding to the first slot. That is, the server may not ask for confirmation from the user, but directly determine the potential entity as the information corresponding to the first slot. If the minimum value is less than or equal to the threshold B, and is greater than the threshold A, it may be considered that the user has been likely to say the information corresponding to the first slot. That is, the potential entity may be the information corresponding to the first slot. In this case, the server may further ask for confirmation from the user. This is not limited in this embodiment of this application.

In some other embodiments, the server 200 determines that the first slot corresponds to the system slot type. There are innumerable words of the system slot type. Therefore, Levenshtein distances between the entity word in the first input and all words of the system slot type cannot be calculated by traversing all the words of the system slot type. In this case, the server 200 cannot determine whether the user says the information corresponding to the first slot. To avoid excessive disturbance to the user, the server 200 may not ask for confirmation from the user about the information corresponding to the first slot.

Method 2 is used when the server 200 fails to extract the information corresponding to the first slot because of an inaccurate slot extraction model:

The slot extraction model may recognize entities from the first input by using, for example, a named entity recognition (Named Entity Recognition, NER) method, and input the recognized entities into an algorithm corresponding to the first slot in the slot extraction model, to calculate a confidence level of each entity. Optionally, the slot extraction model may not recognize an entity, but directly inputs each word included in the first input into an algorithm corresponding to the first slot in the slot extraction model, to calculate a confidence level of each word. When the calculated a confidence level of each entity or each word meets a particular condition, it is considered that the user has been likely to say the information corresponding to the first slot, and then confirmation is asked for from the user. For calculation of the confidence level of each entity or each word in the first input, refer to a classification-based calculation method, a sequence marking-based calculation method, and the like in the prior art. Details are not described herein.

For example, the server 200 may input each entity in the first input into the slot extraction model, to calculate the confidence level of each entity. The server 200 asks for confirmation from the user only when a confidence level of an entity meets the particular condition.

That the slot extraction model fails to extract the information corresponding to the first slot may be understood as: A slot marking probability provided by the slot extraction model in the server 200 for an entity recognized from user discourse is less than a recognition threshold. In this case, the user may set a confirmation threshold. When a slot marking probability provided by the slot extraction model for an entity recognized from the user discourse is greater than the confirmation threshold, the server 200 triggers the user confirmation mechanism. That is, the server 200 asks for confirmation from the user about the information corresponding to the first slot only when a confidence level, corresponding to one or more entities in the first input, obtained from a slot extraction model is greater than the confirmation threshold and less than the recognition threshold.

It should be noted that for a same entity and a same slot extraction model, the slot extraction model may not correctly recognize the entity for the first time, but can correctly recognize the entity for the second time. This is because when the user says the entity for the first time, a statement may include another entity. That is, the entity has a context. If the slot extraction model is inaccurate, the entity may fail to be recognized because the context fails to be recognized. Then, when the server 200 cannot recognize the entity for the first time, the server asks the user a question about the entity. In this case, an answer of the user is about the entity. The answer of the user may include only the entity, or very few contexts, and the slot extraction model is likely to recognize the entity this time. In some other embodiments, the entity may also be recognized from the answer of the user in a manner in which the slot extraction model is not used. For example, a rule may be enabled to recognize the entity. The rule is that the entity may be recognized with reference to factors such as context logic of the answer of the user, an association with a user intention, and a correspondence between the entity and the first slot. This can also effectively increase a probability that the server 200 recognizes the entity said by the user for the second time or a subsequent time.

It may be understood that, to implement the foregoing functions, the foregoing terminal or the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of the present invention, division into modules is an example, and is merely a logical function division. In actual implementation, another division manner may be used.

Figure 11:
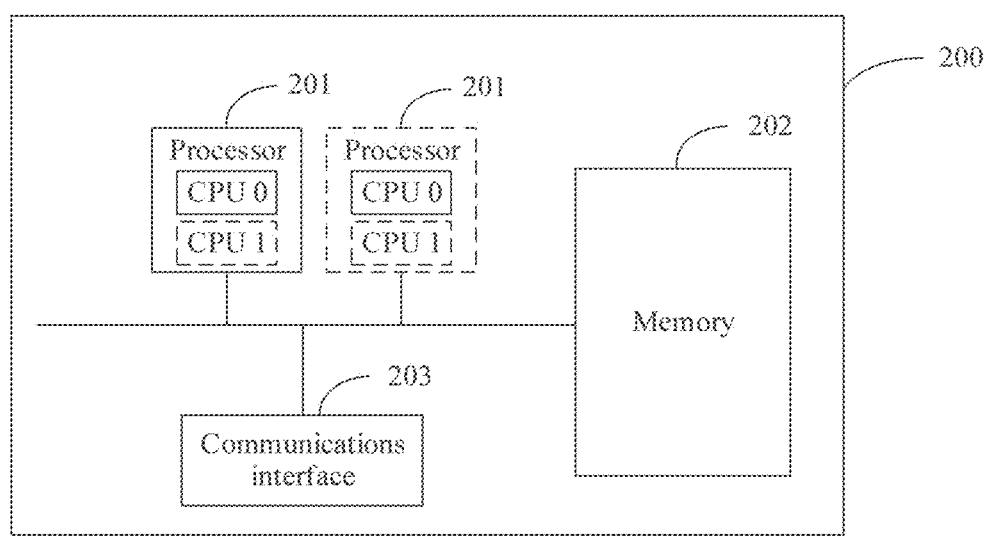
FIG. 11 is a schematic structural diagram of a server according to an embodiment of this application.

FIG. 11 is a schematic diagram of a hardware structure of a server 200 according to an embodiment of this application. The server 200 includes at least one processor 201, at least one memory 202, and at least one communications interface 203. Optionally, the server 200 may further include an output device and an input device that are not shown in FIG. 11.

The processor 201, the memory 202, and the communications interface 203 are connected to each other through a bus. The processor 201 may be a general-purpose central processing unit (Central Processing Unit, CPU), a microprocessor, an application-specific integrated circuit (Application-Specific Integrated Circuit, ASIC), or one or more integrated circuits configured to control program execution of the solutions in this application. The processor 201 may alternatively include a plurality of CPUs, and the processor 201 may be a single-core (single-CPU) processor or a multi-core (multi-CPU) processor. The processor herein may be one or more devices circuits, and/or processing cores configured to process data (for example, a computer program instruction).

The memory 202 may be a read-only memory (read-only memory, ROM) or another type of static storage device that can store static information and an instruction; or a random access memory (random access memory, RAM) or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or another compact disc storage medium, optical disc storage medium (including a compact disc, a laser disc, an optical disc, a digital versatile disc, a Blu-ray disc, or the like), a magnetic disk storage medium, another magnetic storage device, or any other medium that can be used to carry or store expected program code in a form of an instruction or a data structure and that can be accessed by a computer. This is not limited. The memory 202 may exist independently and is connected to the processor 201 through a bus. The memory 202 may alternatively be integrated with the processor 201. The memory 202 is configured to store application program code for executing the solutions in this application, and the processor 201 controls the execution. The processor 201 is configured to execute the computer program code stored in the memory 202, to implement the human-computer interaction method in the embodiments of this application.

The communications interface 203 may be configured to communicate with another device or communications network, such as Ethernet or a wireless local area network (wireless local area network, WLAN).

When communicating with the processor, the output device may display information in a plurality of manners. For example, the output device may be a liquid crystal display (Liquid Crystal Display, LCD), a light-emitting diode (Light-Emitting Diode, LED) display device, a cathode ray tube (Cathode Ray lube, CRT) display device, a projector (projector), or the like. When communicating with the processor, the input device may receive an input of a user in a plurality of manners. For example, the input device may be a mouse, a keyboard, a touchscreen device, or a sensing device.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A human-computer interaction method, implemented by a human-computer dialog system, wherein the human-computer interaction method comprises:
   receiving a first input that comprises a service requirement of a user;
   determining, based on the first input, a first field corresponding to the first input, wherein the first field is a task scenario corresponding to the service requirement;
   distributing the first input to an intention recognition model corresponding to the first field;
   recognizing a first intention corresponding to the first input and based on the intention recognition model, wherein the first intention is a sub-scenario of the first field;
   attempting to extract, from the first input, first information corresponding to a first slot in the first intention, wherein the first slot is preconfigured in the first intention, and wherein the first slot is an optional key slot;
   asking, when the first information fails to be extracted, the user a first question to determine whether the first information is necessary;
   receiving a second input that comprises second information from the user to determine whether the first information is necessary;
   when the second input indicates that the first information, is necessary, extracting the first information from the second input and performing, based on the first intention and the first information, an operation corresponding to the first intention, and
   when the second input indicates that the first information is unnecessary, skipping extracting the first information and performing, based on the first intention, the operation.

2. The human-computer interaction method of claim 1, further comprising:
   inputting each of a plurality of words or each of a plurality of entities from the first input into a slot extraction model corresponding to the first slot;
   calculating a first confidence level corresponding to each of the words or each of the entities and based on the slot extraction model;
   determining that a first word of the words or a first entity of the entities is the first information when a second confidence level of the first word or the first entity is greater than or equal to a first threshold, and
   determining that the first information fails to be extracted when the first confidence level is less than the first threshold.

3. The human-computer interaction method of claim 1, further comprising:
   calculating a first similarity between each of a plurality of entities from the first input and each of a plurality of words of a user-defined slot type when the first slot corresponds to the user-defined slot type;
   determining that the first input does not comprise the first information when the first similarity is less than a second threshold;
   determining that a second word of the user-defined slot type is the first information when a second similarity between a second entity in the first input and the second word is greater than or equal to a third threshold; and
   determining, when a third similarity between any of the entities and any of the words is greater than or equal to the second threshold and less than the third threshold, to ask the user the first question to determine whether the first information is necessary.

4. The human-computer interaction method to claim 2, further comprising:
   determining that the first input does not comprise the first information when the first confidence level is less than a fourth threshold; and
   determining to ask the user the first question to determine whether the first information is necessary when a third confidence level of any of the words or any of the entities is less than the first threshold and is greater than or equal to the fourth threshold.

5. The human-computer interaction method of claim 1, wherein when the second input indicates that the first information is necessary, extracting the first information extracting the first information from the second input using a slot extraction model corresponding to the first slot or using a rule.

6. The human-computer interaction method of claim 1, wherein a second slot is further preconfigured in the first intention, wherein the second slot is a mandatory slot, and wherein the human-computer interaction method further comprises:
   asking the user a second question to extract third information corresponding to the second slot when determining that the third information fails to be extracted;
   receiving a third input;
   extracting the third information from the third input, wherein the third input comprises an answer from the user; and
   performing, based on the first intention, the first information, and the third information, the operation, or performing, based on the first intention and the third information, the operation.

7. The human-computer interaction method of claim 1, wherein a second slot is further preconfigured in the first intention, wherein the second slot is an optional non-key slot, and wherein the human-computer interaction method further comprises skipping extracting information corresponding to the second slot when the information corresponding to the second slot fails to be extracted.

8. The human-computer interaction method of claim 1, wherein an attribute of the first slot is based on an input from a developer.

9. The human-computer interaction method of claim 1, wherein the first question is a default question or is based on an input from a developer.

10. A server, comprising:
    a processor; and
    a memory coupled to the processor and configured to store instructions that, when executed by the processor, cause the server to be configured to:
    receive a first input that comprises a service requirement of a user;

determine, based on the first input, a first field corresponding to the first input, wherein the first field is a task scenario corresponding to the service requirement;

distribute the first input to an intention recognition model corresponding to the first field;

recognize a first intention corresponding to the first input and based on the intention recognition model, wherein the first intention is a sub-scenario of the first field;

attempt to extract, from the first input, first information corresponding to a first slot in the first intention, wherein the first slot is preconfigured in the first intention, and wherein the first slot is an optional key slot;

ask, when the first information fails to be extracted, the user a question to determine whether the first information is necessary;

receive a second input that comprises second information from the user to determine whether the first information is necessary;

when the second input indicates that the first information is necessary, extract the first information from the second input and perform, based on the first intention and the first information, an operation corresponding to the first intention; and when the second input indicates that the first information is unnecessary, skip extracting the first information and perform, based on the first intention, the operation.

11. The server of claim 10, wherein the instructions further cause the server to be configured to extract, when the second input indicates that the first information is the necessary, the first information from the second input using a slot extraction model corresponding to the first slot or using a rule.

12. A computer program product comprising computer-executable instructions stored on a non-transitory computer-readable medium that, when executed by a processor, cause a human-computer dialog system to:

receive a first input that comprises a service requirement of a user;

determine, based on the first input, a first field corresponding to the first input, wherein the first field is a task scenario corresponding to the service requirement;

distribute the first input to an intention recognition model corresponding to the first field;

recognize a first intention corresponding to the first input and based on the intention recognition model, wherein the first intention is a sub-scenario of the first field;

attempt to extract, from the first input, first information corresponding to a first slot in the first intention, wherein the first slot is preconfigured in the first intention, and wherein the first slot is an optional key slot;

ask, when the first information fails to be extracted, the user a first question to determine whether the first information is necessary;

receive a second input that comprises second information from the user to determine whether the first information is necessary;

when the second input indicates that the first information is necessary, extract the first information from the second input and perform, based on the first intention and the first information, an operation corresponding to the first intention; and when the second input indicates that the first information is unnecessary, skip extracting the first information and perform, based on the first intention, the operation.

13. The computer program product of claim 12, wherein the instructions further cause the human-computer dialog system to:

input, a plurality of words or a plurality of entities from the first input into a slot extraction model corresponding to the first slot;

calculate a first confidence level corresponding to each of the words or each of the entities and based on the slot extraction model;

determine that a first word of the words or a first entity of the entities is the first information when a second confidence level of the first word or the first entity is greater than or equal to a first threshold; and determine that the first information fails to be extracted when the first confidence level is less than the first threshold.

14. The computer program product of claim 12, wherein the instructions further cause the human-computer dialog system to:

calculate a first similarity between each of a plurality of entities from the first input and each of a plurality of words of a user-defined slot type when the first slot corresponds to the user-defined slot type;

determine that the first input does not comprise the first information when the first similarity is less than a second threshold;

determine that a second word of the user-defined slot type is the first information when a second similarity between a second entity in the first input and the second word is greater than or equal to a third threshold; and determine, when a third similarity between any of the entities and any of the words is greater than or equal to the second threshold and less than the third threshold, to ask the user the first question to determine whether the first information is necessary.

15. The computer program product of claim 13, wherein the instructions further cause the human-computer dialog system to:

determine that the first input does not comprise the first information when the first confidence level is less than a fourth threshold; and determine to ask the user the first question to determine whether the first information is necessary when a third confidence level of any of the words or any of the entities is less than the first threshold and is greater than or equal to the fourth threshold.

16. The computer program product of claim 12, wherein when the second input indicates that the first information is necessary, the instructions that cause the human-computer dialog system to extract the first information from the second input further cause the human-computer dialog system to extract the first information from the second input using a slot extraction model corresponding to the first slot or using a rule.

17. The computer program product of claim 12, wherein a second slot is further preconfigured in the first intention, wherein the second slot is a mandatory slot, and wherein the instructions further cause the human-computer dialog system to:

ask the user a second question to extract third information corresponding to the second slot when the third information fails to be extracted;

receive a third input;

extract the third information from the third input, wherein the third input comprises an answer from the user; and perform, based on the first intention, the first information, and the third information, the operation, or perform, based on the first intention and the third information, the operation.

18. The computer program product of claim 12, wherein a second slot is further preconfigured in the first intention, wherein the second slot is an optional non-key slot, wherein the instructions further cause the human-computer dialog system to skip extracting information corresponding to the second slot when the information corresponding to the second slot fails to be extracted.

19. The computer program product of claim 12, wherein an attribute of the first slot is based on an input from a developer.

20. The computer program product of claim 12, wherein the first question is a default question or is based on an input from a developer.

* * * * *

UNITED STATES PATENT AND TRADEMARK OFFICE
CERTIFICATE OF CORRECTION

PATENT NO. : 11,636,852 B2
APPLICATION NO. : 17/284122
DATED : April 25, 2023
INVENTOR(S) : Qing Zhang, Jinhui Zhang and Yibo Zhang Page 1 of 1

It is certified that error appears in the above-identified patent and that said Letters Patent is hereby corrected as shown below:

In the Claims

Claim 1, Column 33, Line 39: "is necessary, extracting the" should read "extracting the"

Claim 5, Column 34, Line 27: "extracting the first" should read "from the second input comprises extracting the first"

Signed and Sealed this
Twenty-third Day of May, 2023

Katherine Kelly Vidal
*Director of the United States Patent and Trademark Office*